US012539871B2

United States Patent
Li et al.

(10) Patent No.: US 12,539,871 B2
(45) Date of Patent: Feb. 3, 2026

(54) METHOD, APPARATUS, AND SYSTEM FOR ROAD WARNING

(71) Applicant: SHENZHEN YINWANG INTELLIGENT TECHNOLOGIES CO., LTD., Shenzhen (CN)

(72) Inventors: Hao Li, Shenzhen (CN); Qiuyuan Tang, Shanghai (CN); Meiqing Qiu, Shanghai (CN); Yuanzhi Lu, Shenzhen (CN); Wei Zhou, Shanghai (CN)

(73) Assignee: Shenzhen Yinwang Intelligent Technologies Co., Ltd.

( * ) Notice: Subject to any disclaimer, the term of this patent is extended or adjusted under 35 U.S.C. 154(b) by 82 days.

(21) Appl. No.: 18/361,650

(22) Filed: Jul. 28, 2023

(65) Prior Publication Data
US 2023/0373512 A1 Nov. 23, 2023

Related U.S. Application Data

(63) Continuation of application No. PCT/CN2021/074522, filed on Jan. 29, 2021.

(51) Int. Cl.
*B60W 50/14* (2020.01)
*B60W 40/06* (2012.01)

(52) U.S. Cl.
CPC ............ *B60W 50/14* (2013.01); *B60W 40/06* (2013.01); *B60W 2050/146* (2013.01); *B60W 2552/05* (2020.02); *B60W 2556/45* (2020.02)

(58) Field of Classification Search
CPC ................. B60W 50/14; B60W 40/06; B60W 2050/146; B60W 2552/05; B60W 2556/45; G01C 21/3415; G01C 21/3461; G01C 21/3694; G08G 1/096716; G08G 1/096775; G08G 1/096783; G08G 1/207; G08G 1/096741; G08G 1/0116; G08G 1/09623; G05D 1/0214
See application file for complete search history.

(56) References Cited

U.S. PATENT DOCUMENTS 8,294,594 B2 * 10/2012 Goudy ............ G08G 1/096783
340/905
10,157,422 B2 * 12/2018 Jordan Peters .... G06Q 30/0207
(Continued)

FOREIGN PATENT DOCUMENTS

| CN | 105225509 A | 1/2016 |
|----|-------------|--------|
| CN | 109671264 A | 4/2019 |

(Continued)

OTHER PUBLICATIONS

Extended European Search Report in European Appln. No. 21921902.9, mailed on Feb. 2, 2024, 15 pages.
(Continued)

*Primary Examiner* — Adnan Aziz
(74) *Attorney, Agent, or Firm* — Fish & Richardson P.C.

(57) ABSTRACT

The present disclosure relates to methods, apparatuses, and systems for road warning. In one example method, when using a vehicle to travel, a user may be indicated in advance that a dangerous road exists based on a driving intention of the vehicle and a distance from the dangerous road. The vehicle can start advance warning when it is determined that a driving intention probability of the vehicle to the dangerous road is not less than a specified threshold.

15 Claims, 20 Drawing Sheets

(56) References Cited

U.S. PATENT DOCUMENTS

| | | | |
|---|---|---|---|
| 10,593,205 B1* | 3/2020 | Jones | G01C 21/3461 |
| 2005/0256638 A1* | 11/2005 | Takahashi | G01C 21/3461 |
| | | | 340/995.19 |
| 2007/0080825 A1* | 4/2007 | Shiller | G08G 1/166 |
| | | | 340/903 |
| 2007/0225882 A1* | 9/2007 | Yamaguchi | B60W 50/14 |
| | | | 701/45 |
| 2014/0200782 A1* | 7/2014 | Goudy | G08G 1/166 |
| | | | 701/70 |
| 2017/0314957 A1* | 11/2017 | Mimura | G01C 21/3697 |
| 2018/0322782 A1* | 11/2018 | Engel | G08G 1/163 |
| 2019/0156150 A1* | 5/2019 | Krishnan | G06V 40/70 |
| 2019/0286150 A1 | 9/2019 | Denaro | |
| 2020/0088526 A1 | 3/2020 | Dousse et al. | |
| 2020/0089977 A1* | 3/2020 | Lakshmi Narayanan | |
| | | | G06F 18/253 |
| 2020/0117203 A1 | 4/2020 | Yang et al. | |

FOREIGN PATENT DOCUMENTS

| | | |
|---|---|---|
| CN | 109785633 A | 5/2019 |
| CN | 211335970 U | 8/2020 |
| CN | 111882907 A | 11/2020 |
| JP | 2013190920 A | 9/2013 |
| SE | 541225 C2 | 5/2019 |

OTHER PUBLICATIONS

International Search Report and Written Opinion in International Appln. No. PCT/CN2021/074522, mailed on Nov. 3, 2021, 17 pages (with English translation).

EP Communication Pursuant to Article 94(3) EPC in European Appln. No. 21921902.9, mailed on Feb. 4, 2025, 13 pages.

* cited by examiner

CONT.
FROM
FIG. 8A
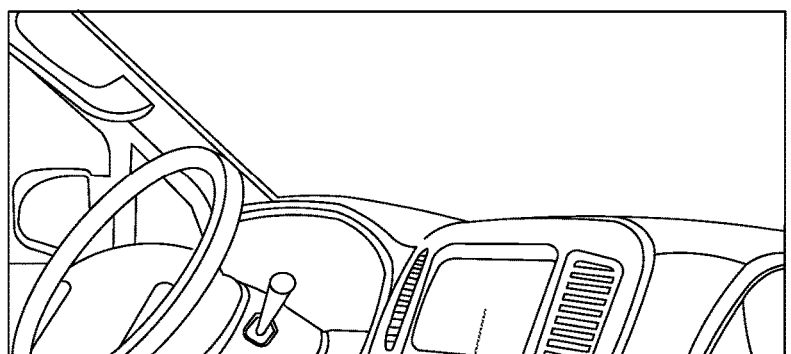
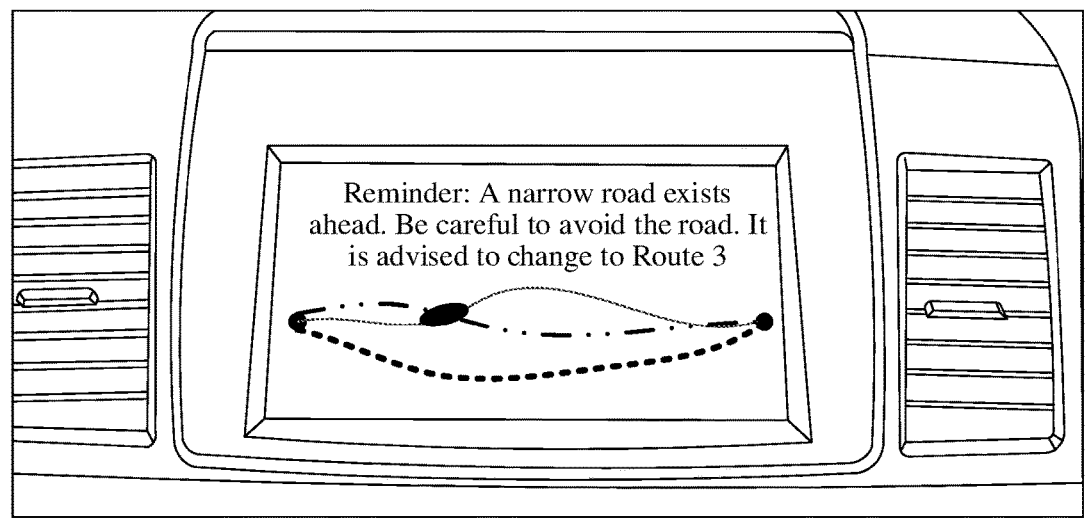
FIG. 8B

CONT.
FROM
FIG. 9A
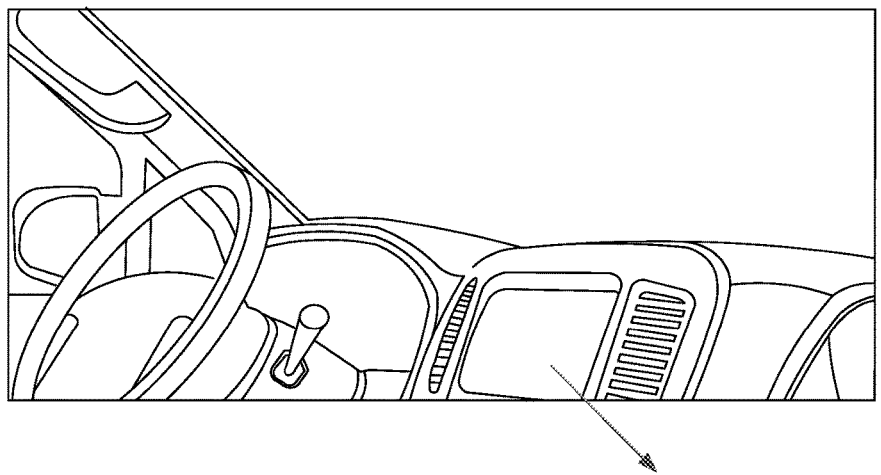
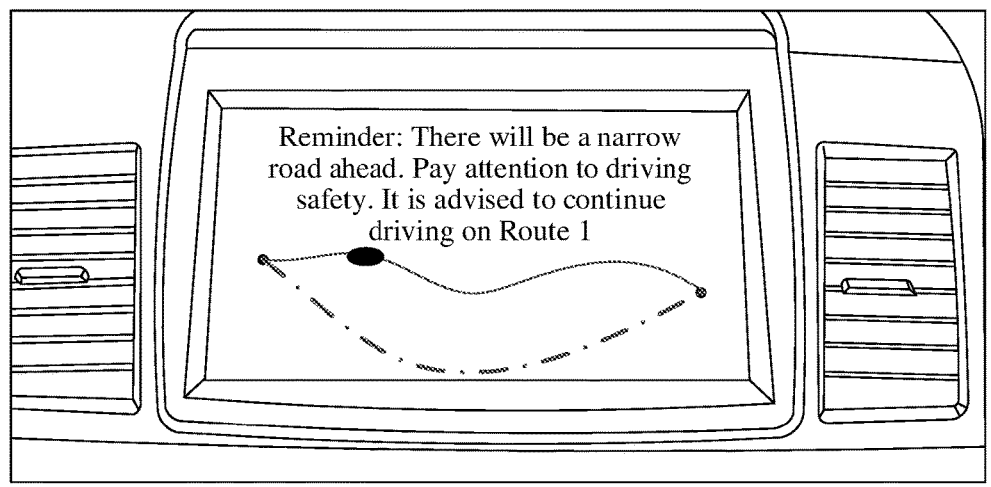
FIG. 9B

METHOD, APPARATUS, AND SYSTEM FOR ROAD WARNING

CROSS-REFERENCE TO RELATED APPLICATIONS

This application is a continuation of International Application No. PCT/CN2021/074522, filed on Jan. 29, 2021, the disclosure of which is hereby incorporated by reference in its entirety.

TECHNICAL FIELD

This application relates to the field of intelligent driving, furthermore, to a method, apparatus, and system for road warning.

BACKGROUND

With popularization of vehicles, vehicles applied to life as means of transport are increasing. However, there are often a number of narrow roads (even impassable roads) in cities, such as alleys in old urban areas. Drivers often drive into such dangerous roads without learning the road situations. As a result, vehicles are not easy to reverse or move forward, which may cause congestion and delay. In addition, drivers may even encounter fast-moving electric vehicles or tricycles, which may cause vehicle scratching and cause property and personal safety risks. Currently, there is no effective solution.

SUMMARY

This application provides a method, apparatus, and system for road warning, so that a vehicle can perform road warning in a timely and effective manner in a driving process.

It should be understood that the method for road warning provided in embodiments of this application may be performed by the apparatus for road warning and the system for road warning.

The system for road warning includes an electronic apparatus and a server.

The electronic apparatus may be an apparatus having functions of communicating with a server and exchanging data. In addition, in an optional manner of embodiments of this application, the electronic apparatus may further have a data processing function and the like.

In an optional manner of embodiments of this application, the electronic apparatus may be a vehicle, or may be an electronic apparatus (for example, a mobile data center (mobile data center, MDC)) loaded on a vehicle, an in-vehicle chip, or the like. This is not limited in embodiments of this application.

The server, which may also be referred to as a receive end, has a capability of analyzing and processing information and communicating with another apparatus.

In an optional manner of embodiments of this application, the server may be a cloud server, may be a database storing map data, or may be a server in a road side unit (road side unit, RSU) or a base station (base station, BS), and stores map data within a surrounding management range.

It should be noted that in embodiments of this application, there may be one or more servers. For example, a map operator may divide an area managed by the map operator into a plurality of regions, and each of the regions has one or more servers.

In addition, in embodiments of this application, the electronic apparatus may directly communicate with the server, or may indirectly communicate with the server, for example, using an intermediate medium such as a road side unit, a base station, or another vehicle for forwarding and exchanging.

Further, in an optional manner of embodiments of this application, when the electronic apparatus is a vehicle, the vehicle includes a collection apparatus, a storage apparatus, a processing apparatus, a communication system, a positioning apparatus, and the like.

The collection apparatus is configured to collect road situation information of a current road, driving information of the vehicle, and the like.

An optional collection apparatus in embodiments of this application may be an apparatus having functions of shooting and sensing.

For example, the collection apparatus in embodiments of this application is a system including a combination of a shooting apparatus and a sensing apparatus, that is, the two apparatuses exist independently, and the two apparatuses are collectively referred to as the collection apparatus. Alternatively, the collection apparatus in embodiments of this application may be an apparatus obtained after a shooting apparatus and a sensing apparatus are integrated together. Alternatively, the collection apparatus in embodiments of this application may be a sensing apparatus having a shooting function.

An example in which the collection apparatus includes a shooting apparatus and a sensing apparatus is used for description. The shooting apparatus of the vehicle in embodiments of this application may be a monocular camera, a binocular camera, or the like. A shooting area of the shooting apparatus may be an external environment of the vehicle.

The sensing apparatus of the vehicle is configured to obtain representation information of an object in the situation information existing in the current road, to assist a processor in the vehicle in analyzing and determining a driving track of the vehicle. For example, the sensing apparatus 220 in embodiments of this application may include a laser radar, a millimeter-wave radar, an ultrasonic radar, and the like that are configured to obtain environment information, and may further include an inertial navigation system and the like that are configured to obtain a vehicle position.

It should be noted that, in this embodiment of this application, the shooting apparatus of the vehicle and the sensing apparatus of the vehicle may be used together to collect the situation information of the current road, so as to assist the processor in predicting the driving track of the vehicle.

The storage apparatus of the vehicle is configured to store one or more programs and data information, where the one or more programs include instructions. The program in embodiments of this application may include a program model used to predict a driving track of the vehicle, a program model used to determine a driving intention value of the vehicle to a narrow road, a program model used to determine a risk index of driving the vehicle on a narrow road, or the like. The data information may include information used to predict a driving track of the vehicle and vehicle information. In addition, in embodiments of this application, on a premise of driver authorization, the data information may further include driver information, social information in an associated mobile phone, and the like.

The vehicle information includes but is not limited to some or all of the following:

a vehicle model, a vehicle width, a vehicle length, a vehicle service life, a vehicle value, and whether an assisted driving or autonomous driving function is configured.

The driver information includes but is not limited to some or all of the following:

an age of a driver, an accident rate of the driver, a health status of the driver, a driving status (for example, whether the driver is fatigued), and the like. The driving status may be identified and determined by using a driver monitor system in the vehicle.

The social information in an associated mobile phone includes but is not limited to some or all of the following:

user social accounts, memos, and shopping lists, such as meal tickets, movie tickets, and destinations in conversations of the user.

The processing apparatus 240 is configured to: predict a driving track of the vehicle based on information obtained by the shooting apparatus 210, the sensing apparatus 220, and a global navigation satellite system (global navigation satellite system, GNSS) 260, and obtain, through calculation and comparison, a value relationship between a driving intention of the vehicle to a narrow road and a driving threshold, or obtain, through calculation and comparison, a value relationship between a risk index of the vehicle for driving on a narrow road and a risk threshold, and upload data information to the server.

The communication system 250 is configured to perform information transmission with the server, and is configured to perform information transmission with another communication apparatus such as a vehicle.

The GNSS 260 is configured to determine a current location of the vehicle on a map.

For example, the GNSS 260 in embodiments of this application may include a global positioning system (global positioning system, GPS) of the United States, Galileo of Europe, Glonas of Russia, BeiDou of China, and the like.

In an optional implementation of embodiments of this application, a method described in a first aspect to a third aspect may be performed by an electronic apparatus. The electronic apparatus may be a vehicle, or may be an electronic apparatus (for example, an MDC) loaded on a vehicle, an in-vehicle chip, or the like. The following uses a vehicle as an example.

In an optional implementation of embodiments of this application, a method described in a fourth aspect to a sixth aspect may be performed by a server. The server may be a cloud server, or may be a database storing map data, or may be a server in a road side unit or a base station BS. This is not limited in embodiments of this application.

According to a first aspect, an embodiment of this application provides a method for road warning. The method includes:

A vehicle sends a first message to a server, where the first message includes a current location of the vehicle; the vehicle receives a second message fed back by the server for the first message, where the second message is used to determine a location of a narrow road in a threshold range of a road section in which the vehicle is currently located, and the road section is determined by the server based on the current location of the vehicle; after determining, based on the second message, that a narrow road exists in a first range that includes the current location, the vehicle predicts a driving intention probability of the vehicle to the narrow road, where the threshold range includes the first range; and when it is determined that the driving intention probability is not less than a specified threshold, the vehicle starts advance warning.

Based on the foregoing method, when using the vehicle to travel, a user may be indicated in advance that a narrow road exists, based on a driving intention of the vehicle and a distance from the narrow road, to avoid a difficulty in reversing the vehicle after the vehicle drives into the road, so as to ensure driving safety, convenience, and the like.

In a possible implementation, the dangerous road includes a narrow road and/or a road without an exit.

In a possible implementation, the narrow road indicates a road with a minimum width less than a road width threshold; or the narrow road indicates a road with a difference between a minimum width of the road and a maximum width of the vehicle not greater than a road width threshold; or the narrow road indicates a road with a difference between a minimum width of the road and an average width of the vehicle not greater than a road width threshold; and/or the narrow road indicates a road with a quantity of in-driving non-motor vehicles greater than a threshold quantity; and/or the narrow road indicates a road with a traffic accident rate greater than a first threshold probability; and/or when there are at least two roads that can lead to a destination; the narrow road indicates a road with a congestion rate greater than a second threshold probability in the at least two roads leading to the destination, or the narrow road indicates a road with a highest congestion rate in the at least two roads leading to the destination.

In a possible implementation, the road without an exit indicates a road that is impassable ahead.

In a possible implementation, the vehicle determines, a location of a dangerous road in the threshold range of the road section based on information that is of a road in the threshold range of the road section and that is included in the second message; and the vehicle determines, based on the location of the dangerous road, that a dangerous road exists in the first range that includes the current location; or the vehicle determines, based on a location that is of a dangerous road in the threshold range of the road section and that is included in the second message, that a dangerous road exists in the first range that includes the current location.

Based on the foregoing method, this embodiment of this application provides a plurality of manners of determining the location of a dangerous road. For example, the vehicle determines, the location of a dangerous road in the threshold range of the road section based on the information that is of a road in the threshold range of the road section and that is included in the second message, and the vehicle determines, based on the location of the dangerous road, that a dangerous road exists in the first range that includes the current location. For another example, the vehicle determines, based on the location that is of a dangerous road in the threshold range of the road section and that is included in the second message, that a dangerous road exists in the first range that includes the current location.

In a possible implementation, before the vehicle predicts the driving intention probability of the vehicle to the dangerous road, the vehicle determines, based on the second message, that a dangerous road exists in a second range that includes the current location, where the first range is larger than the second range.

In a possible implementation, the driving intention probability is determined by the vehicle based on some or all of driving information collected by a sensor of the vehicle, social information in an associated terminal device, and navigation information.

Based on the foregoing method, an embodiment of this application provides an explanation of the driving intention probability.

In a possible implementation, when the dangerous road is the narrow road, before the vehicle starts the advance warning, the vehicle determines that a risk index of the vehicle is greater than a risk threshold. The risk index of the vehicle is determined by the vehicle based on some or all of value of the vehicle, configuration information of the vehicle, driving years of a driver corresponding to the vehicle, a vehicle accident rate, an accident rate of the driver, acceptance of the driver for a narrow road, a driving status of the driver, and a service life of the vehicle.

Based on the foregoing method, in this embodiment of this application, to better improve warning effectiveness, before warning is performed, the risk threshold of the vehicle is first determined, and whether warning needs to be performed is determined based on the risk threshold of the vehicle, to effectively reduce a quantity of unnecessary warnings.

In a possible implementation, before the vehicle sends the first message to the server, the vehicle determines that navigation is not enabled.

In a possible implementation, when the dangerous road is the narrow road, after the vehicle determines that the driving intention probability is not less than the specified threshold and before the vehicle starts the advance warning, the vehicle determines that the vehicle has received the advance warning for times not less than a threshold quantity, and a proportion of continuing to drive into the narrow road in execution results of the advance warning for the times not less than a threshold quantity is less than a proportion threshold.

Based on the foregoing method, in this embodiment of this application, whether to perform warning is determined based on an actual situation of the vehicle, which is more flexible and improves user experience.

In a possible implementation, when the dangerous road is a narrow road, after receiving the advance warning, the vehicle records an execution result of the vehicle and/or the driver, where the execution result includes continuing to drive into the narrow road and avoiding the narrow road.

According to the foregoing method, in this embodiment of this application, after the vehicle receives the warning, an execution result of the vehicle and/or the driver is recorded, so that big data can be continuously accumulated, and whether the advance warning needs to be performed subsequently is determined more flexibly based on an actual situation of the vehicle.

In a possible implementation, after the vehicle starts the advance warning, the vehicle plans a new driving route based on the second message, where the new driving route does not pass through the dangerous road.

According to a second aspect, an embodiment of this application provides a method for road warning. The method includes:

After determining a destination, the vehicle sends a first message to the server, where the first message includes a current location of the vehicle and information of the destination; the vehicle receives a second message fed back by the server for the first message, where the second message includes at least one planned route from the current location to the destination and information of a dangerous road existing in the at least one planned route; and the vehicle determines, based on the second message, a situation of the dangerous road existing in the at least one planned route.

Based on the foregoing method, when using a navigation apparatus to perform navigation, the user may directly learn a situation of a dangerous road existing in a plurality of planned routes to a destination and comprehensive advantages of the route, to select a most suitable route for driving based on an actual requirement. This provides a dangerous road warning to the user in a timely and effective manner, and improves flexibility, practicability, and the like of route planning.

In a possible implementation, the second message is further used to indicate advantage analysis information of the planned route, and the advantage analysis information of the planned route includes some or all of a distance length, a congestion situation, a toll situation, a traffic accident situation, and a narrow road situation.

Based on the foregoing method, in this embodiment of this application, the second message is further used to indicate the advantage analysis information of the planned route, so that the user can learn, based on the second message, some or all of the distance length, the congestion situation, the toll situation, the traffic accident situation, and the narrow road situation of the planned route, so that the user can better determine a driving route.

In a possible implementation, after the vehicle determines, based on the second message, the situation of the dangerous road existing in the at least one planned route, the vehicle marks, on a navigation display interface, the dangerous road existing in the at least one planned road section.

According to a third aspect, an embodiment of this application provides a method for road warning. The method includes:

A vehicle receives a warning indication from a server, where the warning indication is sent by the server to the vehicle after the server detects that the vehicle located in a first monitoring range has a driving intention to drive into a second monitoring range, and a dangerous road exists in the second monitoring range; and the vehicle determines, based on the warning indication, whether to continue to drive into the second monitoring range.

Based on the foregoing method, after it is determined that the vehicle drives into the first monitoring range, the server within a narrow road may determine, based on the driving intention of the vehicle, whether the vehicle has a driving intention to drive into the second monitoring range. After the vehicle has the driving intention to drive into the second monitoring range, the server sends the warning indication to the vehicle, so that the vehicle can learn a situation of a dangerous road in a timely manner, to avoid a difficulty in reversing the vehicle after the vehicle drives into the road, so as to ensure driving safety, convenience, and the like.

In a possible implementation, the dangerous road includes a narrow road and/or a road without an exit.

In a possible implementation, the narrow road indicates a road with a minimum width less than a road width threshold; or the narrow road indicates a road with a difference between a minimum width of the road and a maximum width of the vehicle not greater than a road width threshold; or the narrow road indicates a road with a difference between a minimum width of the road and an average width of the vehicle not greater than a road width threshold; and/or the narrow road indicates a road with a quantity of in-driving non-motor vehicles greater than a threshold quantity; and/or the narrow road indicates a road with a traffic accident rate greater than a first threshold probability; and/or when there are at least two roads that can lead to a destination; the narrow road indicates a road with a congestion rate greater than a second threshold probability in the at least two roads leading to the destination, or the narrow road indicates a road with a highest congestion rate in the at least two roads leading to the destination.

In a possible implementation, the road without an exit indicates a road that is impassable ahead.

According to a fourth aspect, an embodiment of this application provides a method for road warning. The method includes:

A server receives a first message from a vehicle, where the first message includes a current location of the vehicle; the server determines a second message based on the first message, where the second message is used to determine a location of a dangerous road in a threshold range of a road section in which the vehicle is currently located, and the road section is determined by the server based on the current location of the vehicle; and the server feeds back the second message to the vehicle, so that the vehicle determines, based on the second message, whether a dangerous road exists in a first range of the current location of the vehicle.

Based on the foregoing method, when using the vehicle to travel, a user may be indicated in advance that a narrow road exists, based on a driving intention of the vehicle and a distance from the narrow road, to avoid a difficulty in reversing the vehicle after the vehicle drives into the road, so as to ensure driving safety, convenience, and the like.

In a possible implementation, the dangerous road includes a narrow road and/or a road without an exit.

In a possible implementation, the narrow road indicates a road with a minimum width less than a road width threshold; or the narrow road indicates a road with a difference between a minimum width of the road and a maximum width of the vehicle not greater than a road width threshold; or the narrow road indicates a road with a difference between a minimum width of the road and an average width of the vehicle not greater than a road width threshold; and/or the narrow road indicates a road with a quantity of in-driving non-motor vehicles greater than a threshold quantity; and/or the narrow road indicates a road with a traffic accident rate greater than a first threshold probability; and/or when there are at least two roads that can lead to a destination; the narrow road indicates a road with a congestion rate greater than a second threshold probability in the at least two roads leading to the destination, or the narrow road indicates a road with a highest congestion rate in the at least two roads leading to the destination.

In a possible implementation, the road without an exit indicates a road that is impassable ahead.

In a possible implementation, the second message includes information of a road in the threshold range of the road section, or the location that is of the dangerous road in the threshold range of the road section and that is included in the second message.

According to a fifth aspect, an embodiment of this application provides a method for road warning. The method includes:

A server receives a first message from a vehicle, where the first message includes a current location and information of a destination of the vehicle, and the first message is sent by the vehicle after the vehicle determines the destination; the server generates a second message based on the first message, where the second message includes at least one planned route from the current location to the destination, and information of a dangerous road existing in the at least one planned route; and the server feeds back the second message to the vehicle.

Based on the foregoing method, when using a navigation apparatus to perform navigation, the user may directly learn a narrow road situation in a plurality of planned routes to the destination and comprehensive advantages of the routes, to select a most suitable route for driving based on an actual requirement. This helps perform narrow road warning to the user in a timely and effective manner, and improves flexibility, practicability, and the like of route planning.

In a possible implementation, the second message is further used to indicate advantage analysis information of the at least one planned route, and the advantage analysis information of the planned route includes some or all of a distance length, a congestion situation, a toll situation, a traffic accident situation, and a narrow road situation.

Based on the foregoing method, in this embodiment of this application, the second message is further used to indicate the advantage analysis information of the planned route, so that the user can learn, based on the second message, some or all of the distance length, the congestion situation, the toll situation, the traffic accident situation, and the narrow road situation of the planned route, so that the user can better determine a driving route.

According to a sixth aspect, an embodiment of this application provides a method for road warning. The method includes:

A server monitors a driving vehicle in a first monitoring range; the server determines a vehicle that is in the first monitoring range and that has a driving intention to drive into a second monitoring range as a target vehicle, where the second monitoring range is smaller than the first monitoring range, and a dangerous road exists in the second monitoring range; and the server sends a warning indication to the target vehicle, where the warning indication is used to indicate that the target vehicle is to drive into the dangerous road.

Based on the foregoing method, after it is determined that the vehicle drives into the first monitoring range, the electronic apparatus within a narrow road may determine, based on the driving intention of the vehicle, whether the vehicle has a driving intention to drive into the second monitoring range. After the vehicle has the driving intention to drive into the second monitoring range, the electronic apparatus sends the warning indication to the vehicle, so that the vehicle can learn a situation of a dangerous road in a timely manner, to avoid a difficulty in reversing the vehicle after the vehicle drives into the road, so as to ensure driving safety, convenience, and the like.

In a possible implementation, the dangerous road includes a narrow road and/or a road without an exit.

In a possible implementation, the narrow road indicates a road with a minimum width less than a road width threshold; or the narrow road indicates a road with a difference between a minimum width of the road and a maximum width of the vehicle not greater than a road width threshold; or the narrow road indicates a road with a difference between a minimum width of the road and an average width of the vehicle not greater than a road width threshold; and/or the narrow road indicates a road with a quantity of in-driving non-motor vehicles greater than a threshold quantity; and/or the narrow road indicates a road with a traffic accident rate greater than a first threshold probability; and/or when there are at least two roads that can lead to a destination; the narrow road indicates a road with a congestion rate greater than a second threshold probability in the at least two roads leading to the destination, or the narrow road indicates a road with a highest congestion rate in the at least two roads leading to the destination.

In a possible implementation, the road without an exit indicates a road that is impassable ahead.

In a possible implementation, the server is located in the dangerous road.

In a possible implementation, the driving intention of the vehicle is determined by the server according to some or all of driving information collected by a sensor of the vehicle, social information in a terminal device associated with the vehicle, and navigation information.

In a possible implementation, when the dangerous road is the narrow road, the server determines, as a target vehicle, a vehicle that is in the first monitoring range and that has a driving intention to drive into the second monitoring range and has a risk index of the vehicle greater than a risk threshold, where the risk index of the vehicle is determined by the server based on some or all of value of the vehicle, configuration information of the vehicle, driving years of a driver corresponding to the vehicle, a vehicle accident rate, an accident rate of the driver, acceptance of the driver for a narrow road, a driving status of the driver, and a service life of the vehicle.

In a possible implementation, when the dangerous road is the narrow road, before the server sends the warning indication to the target vehicle, the server determines that the target vehicle is in an autonomous driving state, the target vehicle has received advance warning for times not less than a threshold quantity, and a proportion of continuing to drive into the narrow road in execution results of the advance warning for the times not less than a threshold quantity is less than a proportion threshold.

According to a seventh aspect, an embodiment of this application further provides an apparatus for road warning. The apparatus may be configured to perform an operation in any possible implementation of the first aspect and the sixth aspect. For example, the apparatus may include a module or a unit configured to perform each operation in any one of the first aspect or the possible implementations of the first aspect. For example, the apparatus includes a transceiver module and a processing module.

According to an eighth aspect, an embodiment of this application provides a chip system. The chip system includes a processor, and in some embodiments, further including a memory. The memory is configured to store a computer program, and the processor is configured to invoke the computer program from the memory and run the computer program, so that an apparatus for road warning in which the chip system is installed performs the method according to any one of the first aspect or the sixth aspect, or the possible implementations of the first aspect or the sixth aspect.

According to a ninth aspect, an embodiment of this application provides a vehicle, at least one sensor, at least one memory, at least one transceiver, and at least one processor.

The sensor is configured to collect driving information of the vehicle.

The memory is configured to store one or more programs and data information, and the one or more programs include instructions.

The transceiver is configured to: send a first message to a server, where the first message includes a current location of the vehicle; and receive a second message fed back by the server for the first message, where the second message is used to determine a location of a narrow road in a threshold range of a road section in which the vehicle is currently located, and the road section is determined by the server based on the current location of the vehicle.

The processor is configured to: after determining, based on the second message, that a narrow road exists in a first range that includes the current location, predict a driving intention probability of the vehicle to the narrow road, where the threshold range includes the first range; and start advance warning when it is determined that the driving intention probability is not less than a specified threshold.

According to a tenth aspect, an embodiment of this application provides a vehicle, at least one sensor, at least one memory, at least one transceiver, and at least one processor.

The sensor is configured to collect driving information of the vehicle.

The memory is configured to store one or more programs and data information, and the one or more programs include instructions.

The transceiver is configured to: after determining a destination, send a first message to a server, where the first message includes a current location of the vehicle and information of the destination; and receive a second message fed back by the server for the first message, where the second message includes at least one planned route from the current location to the destination, and information of a narrow road existing in the at least one planned route.

The processor is configured to determine, based on the second message, a situation of the narrow road existing in the at least one planned route.

According to an eleventh aspect, an embodiment of this application provides a vehicle, at least one memory, at least one transceiver, and at least one processor.

The memory is configured to store one or more programs and data information, and the one or more programs include instructions.

The transceiver is configured to receive a warning indication from an electronic apparatus, where the warning indication is sent by the electronic apparatus to the vehicle after the electronic apparatus detects that the vehicle located in a first monitoring range has a driving intention of driving into a second monitoring range, and a narrow road exists in the second monitoring range.

The processor is configured to determine, based on the warning indication, whether to continue to drive into the second monitoring range.

According to a twelfth aspect, an embodiment of this application provides a first system for road warning. The system includes at least one vehicle and a server.

The vehicle is configured to: send a first message to the server, where the first message includes a current location of the vehicle; receive a second message fed back by the server for the first message, where the second message is used to determine a location of a narrow road in a threshold range of a road section in which the vehicle is currently located, and the road section is determined by the server based on the current location of the vehicle; after determining, based on the second message, that a narrow road exists in a first range that includes the current location, predict a driving intention probability of the vehicle to the narrow road; and when it is determined that the driving intention probability is not less than a specified threshold, start advance warning.

The server is configured to: receive a first message from a vehicle, where the first message includes a current location of the vehicle; determine a second message based on the first message, where the second message is used to determine a location of a narrow road in a threshold range of a road section in which the vehicle is currently located, and the road section is determined by the server based on the current location of the vehicle; and feed back the second message to the vehicle, so that the vehicle determines, based on the second message, whether a narrow road exists in a first range of the current location of the vehicle.

According to a thirteenth aspect, an embodiment of this application provides a first system for road warning. The system includes at least one vehicle and a server.

The vehicle is configured to: after determining a destination, send a first message to the server, where the first message includes a current location of the vehicle and information of the destination; receive a second message fed back by the server for the first message, where the second message includes at least one planned route from the current location to the destination and information of a narrow road existing in the at least one planned route; and determine, based on the second message, a situation of the narrow road existing in the at least one planned route.

The server is configured to: receive a first message from a vehicle, where the first message includes a current location of the vehicle and information of a destination, and the first message is sent by the vehicle after the vehicle determines the destination; generate a second message based on the first message, where the second message includes at least one planned route from the current location to the destination, and information of a narrow road existing in the at least one planned route; and feed back the second message to the vehicle.

According to a fourteenth aspect, an embodiment of this application provides a first system for road warning. The system includes at least one vehicle and a server.

The server is configured to: monitor a driving vehicle in a first monitoring range; determine a vehicle that is in the first monitoring range and that has a driving intention to drive into a second monitoring range as a target vehicle, where the second monitoring range is smaller than the first monitoring range, and a narrow road exists in the second monitoring range; and send a warning indication to the target vehicle, where the warning indication is used to indicate that the target vehicle is to drive into the narrow road.

The vehicle is configured to: receive a warning indication from the server, where the warning indication is sent by the server to the vehicle after the server detects that the vehicle located in the first monitoring range has a driving intention to drive into the second monitoring range, and a narrow road exists in the second monitoring range; and determine, based on the warning indication, whether to continue to drive into the second monitoring range. In a possible implementation, the server is one or more of a vehicle, a road side unit RSU, and a cloud server.

According to a fifteenth aspect, an embodiment of this application provides a computer program product. The computer program product includes computer program code. When the computer program code is run by a communication module, a processing module, a transceiver, or a processor of an apparatus for road warning, the apparatus for road warning is enabled to perform the method according to any one of the first aspect or the sixth aspect, or the possible implementations of the first aspect or the sixth aspect.

According to a sixteenth aspect, an embodiment of this application provides a computer-readable storage medium. The computer-readable storage medium stores a program, and the program enables an apparatus for road warning to perform the method according to any one of the first aspect or the sixth aspect, or the possible implementations of the first aspect or the sixth aspect.

BRIEF DESCRIPTION OF DRAWINGS

FIG. 8A and FIG. 8B are a schematic diagram of a fourth application scenario according to an embodiment of this application;

FIG. 9A and FIG. 9B are a schematic diagram of a fifth application scenario according to an embodiment of this application;

DESCRIPTION OF EMBODIMENTS

With popularization of vehicles, vehicles applied to life as means of transport are increasing. However, there are often a number of narrow roads (even impassable roads) in cities, such as alleys in old urban areas. Drivers often drive into such dangerous roads without learning the road situations. As a result, vehicles are not easy to reverse or forward, which may cause congestion and delay. In addition, fast-moving electric vehicles or tricycles (such as take-out vehicles) may come out, which may cause vehicle scratching and cause property and personal safety risks.

Currently, most methods for processing a dangerous road situation are based on an emergency processing mechanism used after the vehicle drives into the dangerous road, which does not prevent the vehicle from driving into the dangerous road at the root. There is still a safety risk.

To resolve this problem, embodiments of this application provide a method and apparatus for road warning. When it is determined that a driving intention of a vehicle to at least one dangerous road within a specific range exceeds a driving threshold, advance warning is performed on the vehicle, so as to effectively reduce problems such as difficulty in driving and a safety risk that are generated when the vehicle drives into the dangerous road.

The dangerous road described in embodiments of this application includes but is not limited to a narrow road, a road without an exit, and the like.

Figure 1:
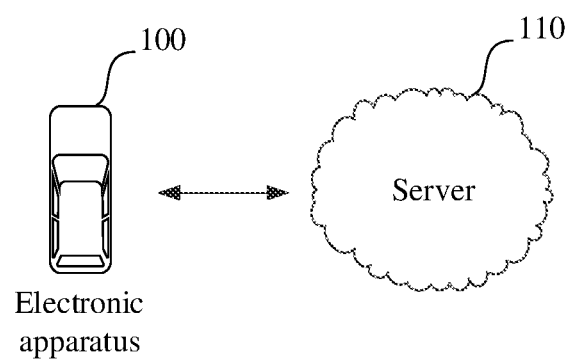
FIG. 1 is a schematic diagram of a system for road warning according to an embodiment of this application.

To facilitate understanding of embodiments of this application, an embodiment of this application provides a processing system for road warning. The processing system may be applied to various application scenarios of intelligent driving. As shown in FIG. 1, the processing system for road warning includes an electronic apparatus 100 and a server 110.

The electronic apparatus 100 may directly communicate with the server 110, or may indirectly communicate with the server 110, for example, using an intermediate medium such as a road side unit RSU, a base station BS, or another vehicle for forwarding and exchanging. The following separately describes the electronic apparatus 100 and the server 110 in the processing system in this embodiment of this application.

Electronic Apparatus 100:

The electronic apparatus 100 in this embodiment of this application is configured to communicate with a server to exchange data. In addition, in an optional manner of this embodiment of this application, the electronic apparatus 100 further has a data processing function and the like.

It should be noted that, in this embodiment of this application, the electronic apparatus for performing road warning may be a vehicle, or may be an electronic apparatus (for example, a mobile data center (mobile data center, MDC)/processor) loaded on a vehicle, an in-vehicle chip, or the like. For ease of description, a vehicle is used as an example for subsequent descriptions.

The interaction data described in this embodiment of this application includes but is not limited to the following types:
current location information of the vehicle, collected information of a road section in front of the vehicle, a current moving direction of the vehicle, a predicted moving track of the vehicle, and the like.

Figure 2:
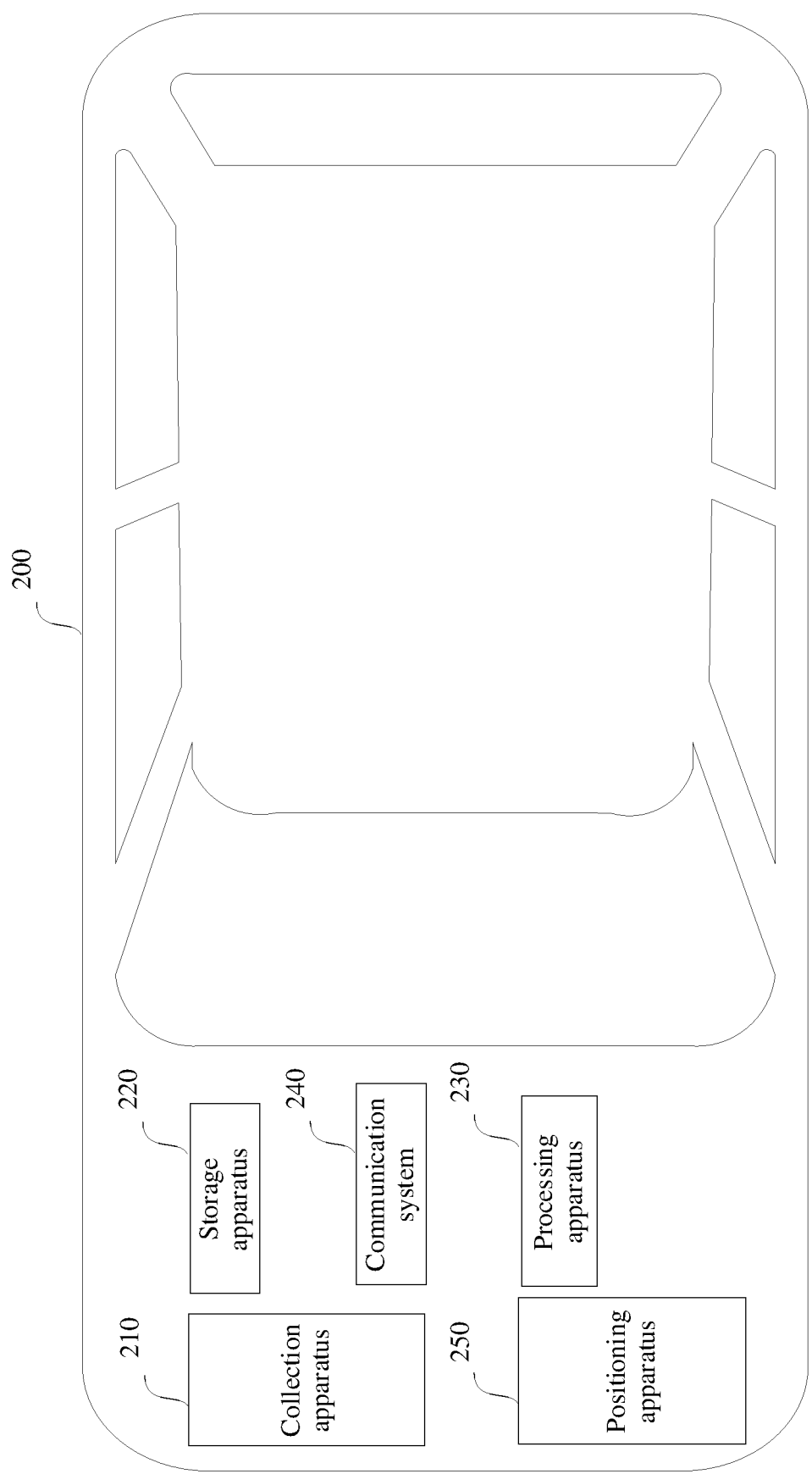
FIG. 2 is a schematic diagram of a vehicle according to this application.

Further, an embodiment of this application provides an internal structure of a vehicle, as shown in FIG. 2, which is not limited to the following content.

The vehicle 200 includes a collection apparatus 210, a storage apparatus 220, a processing apparatus 230, a communication system 240, and a positioning apparatus 250. During specific implementation, the apparatus in embodiments of this application may be independent hardware, or may be a module or unit running in hardware.

The collection apparatus 210 is configured to collect road situation information of a current road, driving information of the vehicle, and the like.

An optional collection apparatus in this embodiment of this application may be an apparatus having functions of shooting and sensing.

For example, the collection apparatus in this embodiment of this application is a system including a combination of a shooting apparatus and a sensing apparatus, that is, the two apparatuses exist independently, and the two apparatuses are collectively referred to as the collection apparatus. Alternatively, the collection apparatus in embodiments of this application may be an apparatus obtained after a shooting apparatus and a sensing apparatus are integrated together. Alternatively, the collection apparatus in embodiments of this application may be a sensing apparatus having a shooting function.

An example in which the collection apparatus 210 includes the shooting apparatus 211 and the sensing apparatus 212 is used for description.

The shooting apparatus 211 is configured to collect road situation information of a current road.

The shooting apparatus in this embodiment of this application may be a monocular camera, a binocular camera, or the like. A shooting area of the shooting apparatus may be an external environment of the vehicle.

The sensing apparatus 212 is configured to obtain representation information of an object in the situation information existing in the current road, so as to assist a processor in the vehicle in analyzing and determining a driving track of the vehicle.

For example, the sensing apparatus 212 in this embodiment of this application may include a laser radar, a millimeter-wave radar, an ultrasonic radar, and the like that are configured to obtain environment information, and may further include an inertial navigation system and the like that are configured to obtain a vehicle position.

It should be noted that, in this embodiment of this application, the shooting apparatus 211 and the sensing apparatus 212 may be used together to collect the situation information of the current road, so as to assist the processing apparatus in predicting the driving track of the vehicle and the like.

The storage apparatus 220 is configured to store one or more programs and data information, and the one or more programs include instructions.

The program in this embodiment of this application may include a program model used to predict a driving track of the vehicle, a program model used to determine a driving intention value of the vehicle to a dangerous road, a program model used to determine a risk index of driving the vehicle on a dangerous road, or the like.

The data information may include information used to predict a driving track of the vehicle and vehicle information.

In addition, in this embodiment of this application, on a premise of driver authorization, the data information may further include driver information, social information in an associated mobile phone, and the like.

The vehicle information includes but is not limited to some or all of the following:
a vehicle model, a vehicle width, a vehicle length, a vehicle service life, a vehicle value, and whether an assisted driving or autonomous driving function is configured.

The driver information includes but is not limited to some or all of the following:
an age of a driver, an accident rate of the driver, a health status of the driver, a driving status (for example, whether the driver is fatigued), and the like. The driving status of the driver may be determined by using a driver monitor system (driver monitor system, DMS) in the vehicle.

The social information in an associated mobile phone includes but is not limited to some or all of the following:
user social accounts, memos, and shopping lists, such as meal tickets, movie tickets, and destinations in conversations of the user.

The processing apparatus 230 is configured to: predict a driving track of the vehicle based on information obtained by the collection apparatus 210 and a global navigation satellite system (global navigation satellite system, GNSS) 250, and obtain, through calculation and comparison, a value relationship between a driving intention of the vehicle to a narrow road and a driving threshold, or obtain, through calculation and comparison, a value relationship between a risk index of the vehicle for driving on a narrow road and a risk threshold, and upload data information to the server.

The communication system 240 is configured to perform information transmission with the server, and is configured to perform information transmission with another communication apparatus such as a vehicle.

The GNSS 250 is configured to determine a current location of the vehicle on a map.

For example, the GNSS 250 in this embodiment of this application may include a global positioning system (global positioning system, GPS) of the United States, Galileo of Europe, Glonas of Russia, BeiDou of China, and the like.

Server 110:

In this embodiment of this application, the server 110 may also be referred to as a receive end, and has a capability of analyzing and processing information and communicating with another apparatus.

The server in this embodiment of this application may be a cloud server, or may be a database storing map data, or may be a server in a road side unit RSU or a base station BS, and stores map data within a surrounding management range.

It should be noted that in this embodiment of this application, there may be a plurality of servers. For example, a map operator may divide an area managed by the map operator into a plurality of regions, and each of the regions has one or more servers.

The system architecture and the service scenario described in this embodiment of this application are intended to more clearly describe the technical solutions in embodiments of this application, and do not constitute a limitation on the technical solutions provided in embodiments of this application.

Further, a person of ordinary skill in the art may learn that, with evolution of network architectures and emergence of new service scenarios, the technical solutions provided in embodiments of this application are also applicable to similar technical problems. It should be understood that FIG. 1 to FIG. 2 are merely simplified schematic diagrams for ease of understanding. The system architecture may further include another device or may further include another unit module.

Some terms in embodiments of this application are explained and described below for ease of understanding.

(1) Narrow road: In an optional case in embodiments of this application, the narrow road indicates that a minimum width of a road is less than a road width threshold.

For example, if it is determined that the road width threshold is 5 meters, and the width of a narrowest part of a road is 3 meters, the road is determined as a narrow road.

For another example, if a difference between a width of a narrowest part of a road and a largest width of a vehicle is less than or equal to the road width threshold, the road is determined as a narrowest road.

For another example, if a difference between a width of a narrowest part of a road and an average width of a vehicle is less than or equal to the road width threshold, the road is determined as a narrow road.

It should be noted that, due to different vehicle models, widths of vehicles of different models are also different. Therefore, a road may be a narrow road for a vehicle 1, but not a narrow road for a vehicle 2.

In addition, a width of a road further includes two cases: an actual passable width and a road building width. The actual passable width of the road may be affected by space occupied by vehicles parked on both sides of the road. For example, at morning and evening time points, a quantity of vehicles parked on the both sides of the road is large, and an occupied road area is large, so that the actual passable width of the road is narrow. At noon and afternoon time points, the quantity of vehicles parked on the both sides of the road is smaller, and the occupied road area is smaller, so that the actual passable width of the road is wide. Therefore, a road may belong to a narrow road at a current time point, but does not belong to a narrow road at a next time point, based on occupation of vehicles parked on both sides of the road.

In an optional case, the narrow road may be alternatively used to indicate that a quantity of in-driving non-motor vehicles of a road is greater than a threshold quantity.

Because in-driving non-motor vehicles have high uncertainty, a road with a large quantity of in-driving non-motor vehicles may be understood as a road with a high danger coefficient. For example, it is assumed that the threshold quantity is 10 vehicles/h. If an average quantity of non-motor vehicles passing through the road per hour reaches 12, the road is determined as a narrow road.

In an optional case, the narrow road may be further used to indicate a road with a traffic accident rate greater than a first threshold probability. The traffic accident rate is used to indicate a probability that a traffic accident occurs on a road section within preset duration.

For example, it is assumed that the preset duration is one month, and one traffic accident occurs on the road section within one month. In this case, it may be determined that a traffic accident rate of the road section is 1%.

Further, it is assumed that the first threshold probability is 2%. If a traffic accident rate of a traffic accident occurring on the road section is 3%, the road is determined as a narrow road.

In an optional case, when there are at least two roads leading to a destination, the narrow road may be further used to indicate a road with a congestion rate greater than a second threshold probability in the at least two roads leading to the destination; or the narrow road may alternatively be used to indicate a road with a highest congestion rate in the at least two roads leading to the destination.

In an optional manner of this embodiment of this application, the congestion rate is used to indicate a ratio of a lane area of a road section to a quantity of vehicles in the road section within preset duration. For example, it is assumed that the second threshold probability is 50%, and there are three roads leading to the destination: A, B, and C. A congestion rate of the road A in a current time period is 20%, a congestion rate of the road B in the current time period is 25%, and a congestion rate of the road C in the current time period is 53%. In this case, the road C is determined as a narrow road in the current time period.

For example, it is assumed that there are three roads leading to the destination: A, B, and C. A congestion rate of the road A in a current time period is 20%, a congestion rate of the road B in the current time period is 25%, and a congestion rate of the road C in the current time period is 53%. In the three roads, the road C has a highest congestion rate in the current time period, and therefore the road C is determined as a narrow road in the current time period.

In addition, when the narrow road indicates a road with a congestion rate greater than a second threshold probability in at least two roads leading to the destination, if there are three roads leading to the destination, and congestion rates of the three roads are all greater than the second threshold probability, a road with a lowest congestion rate in the three roads may be determined as a non-narrow road.

It should be noted that a congestion volume may vary based on different congestion time points. Therefore, a road may be classified as a narrow road at a current time point, but may not be a narrow road at a next time point.

Further, in embodiments of this application, the narrow road may be determined by a server, to effectively reduce a local calculation amount, or may be determined by an electronic apparatus. This is not limited in this application.

(2) Road without an exit: In an optional case in embodiments of this application, the road without an exit is used to indicate a road that is impassable ahead. After driving into the road without exit, the vehicle cannot move forward and out, and can only make a vehicle turn around.

(3) Risk index of a vehicle: In an optional method in embodiments of this application, the risk index of a vehicle is a comprehensive evaluation indicator of a probability that an accident easily occurs in a driving process of the vehicle and/or a loss limit of the vehicle when an accident occurs.

In embodiments of this application, the risk index of a vehicle may be evaluated and determined based on some or all of the following factors:

value of the vehicle, vehicle configuration (for example, whether an advanced driver assistance system ADAS/ autonomous driving system is equipped), driving years/ an accident rate of the driver, acceptance of the driver for a narrow road, a driving status of the driver, and a service life of the vehicle.

(4) Driving intention probability: In an optional method in embodiments of this application, the driving intention is a probability indicator of moving of a vehicle in a direction or to a road in a driving process.

Further, in this embodiment of this application, the vehicle may identify the driving intention probability of the vehicle in a plurality of manners, which are not limited to the following manners:

Identification manner 1: The vehicle obtains vehicle driving information by using a sensor of the vehicle, and predicts a driving direction of the vehicle based on the vehicle driving information by using a processor of the vehicle, and a probability that the vehicle drives toward a direction may be understood as the driving intention probability of the vehicle.

Figure 3:
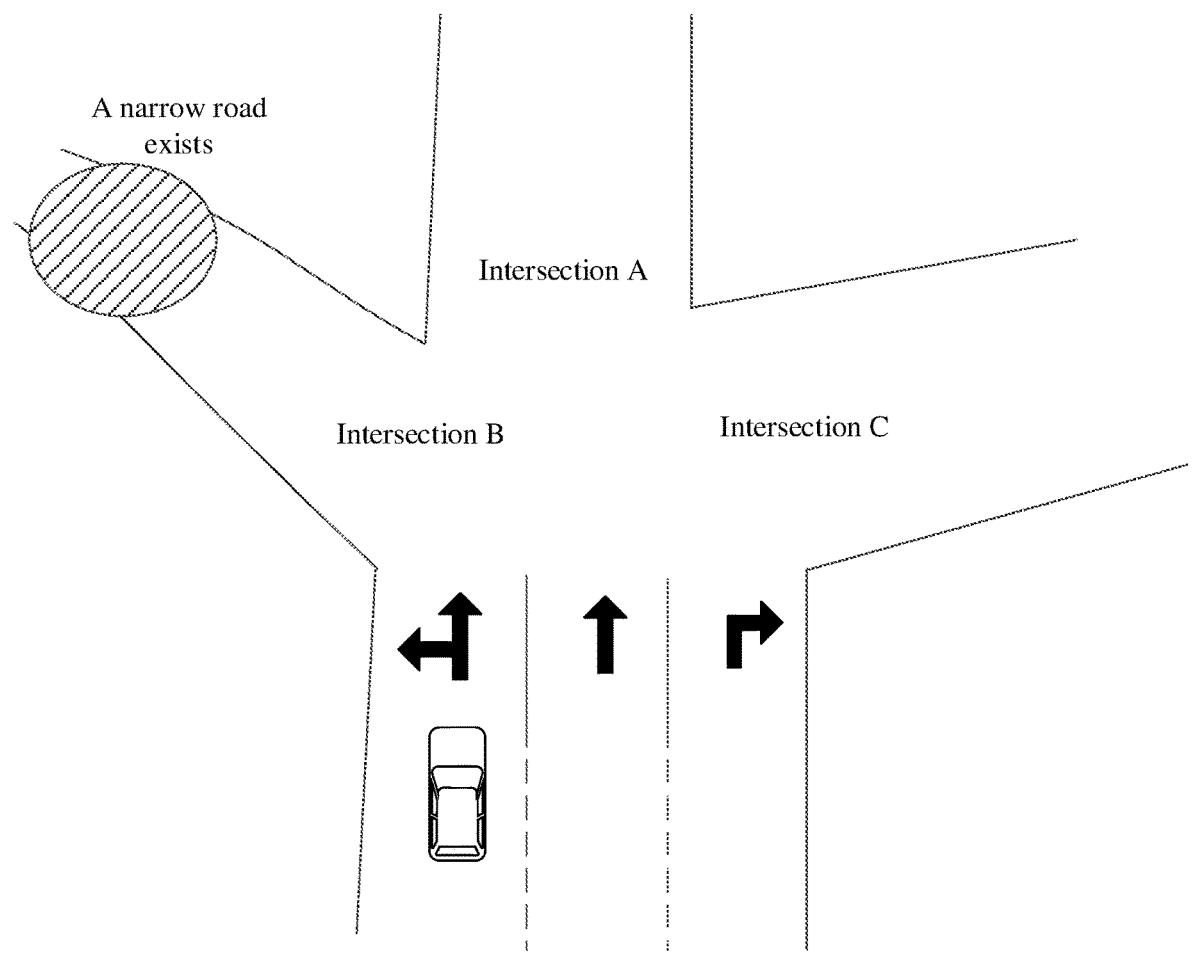
FIG. 3 is a schematic diagram of a first application scenario according to an embodiment of this application.

For example, as shown in FIG. 3, it is assumed that there are three intersections in front of the vehicle, and there is a road section corresponding to an intersection A in the front, a road section corresponding to an intersection B on the front left, and a road section corresponding to an intersection C on the front right. There is a narrow road in the road section corresponding to the intersection B.

It is assumed that, in a driving process, the vehicle learns, by using the sensor of the vehicle, that the vehicle drives in a leftmost lane of a current road section, and the vehicle may learn, by using a collection apparatus of the vehicle, a navigation apparatus of the vehicle, or the like, that the leftmost lane in which the vehicle is currently located allows to move forward and turn left only. Therefore, the processor in the vehicle may predict, based on the current driving lane of the vehicle, that a driving intention of the vehicle is to drive to the intersection A or the intersection B. Because a narrow road exists in the road section corresponding to the intersection A, it may be predicted that a driving intention probability of driving the vehicle to the narrow road is 50%.

Identification manner 2: The vehicle obtains social information of a terminal device associated with the vehicle, and predicts a driving direction of the vehicle based on the social information by using the processor of the vehicle. A probability that the vehicle drives toward a direction may be understood as the driving intention probability of the vehicle.

For example, the social information obtained by the vehicle indicates information of going to a movie theater A at four afternoon to watch a movie, and a current time point is half past three afternoon. Therefore, the processor in the vehicle may predict, through analysis, that a probability that the vehicle currently drives to the movie theater A is 90%.

In other words, a driving intention of the vehicle is to drive to the movie theater A, and an occurrence probability is 90%.

Further, embodiments of this application provide a plurality of methods for narrow road warning. The following describes the method for road warning provided in this application in a plurality of embodiments.

It should be noted that the following description is merely an example of the technical solutions provided in this application, but does not constitute a limitation on the technical solutions provided in this application. Any manner obtained by combining or transforming the following embodiments to resolve the technical problem of this application shall fall within the protection scope of this application.

Embodiment 1: After determining that a vehicle is within a threshold range of driving into a dangerous road, perform advance warning. The dangerous road includes a narrow road and/or a road without an exit.

Figure 4:
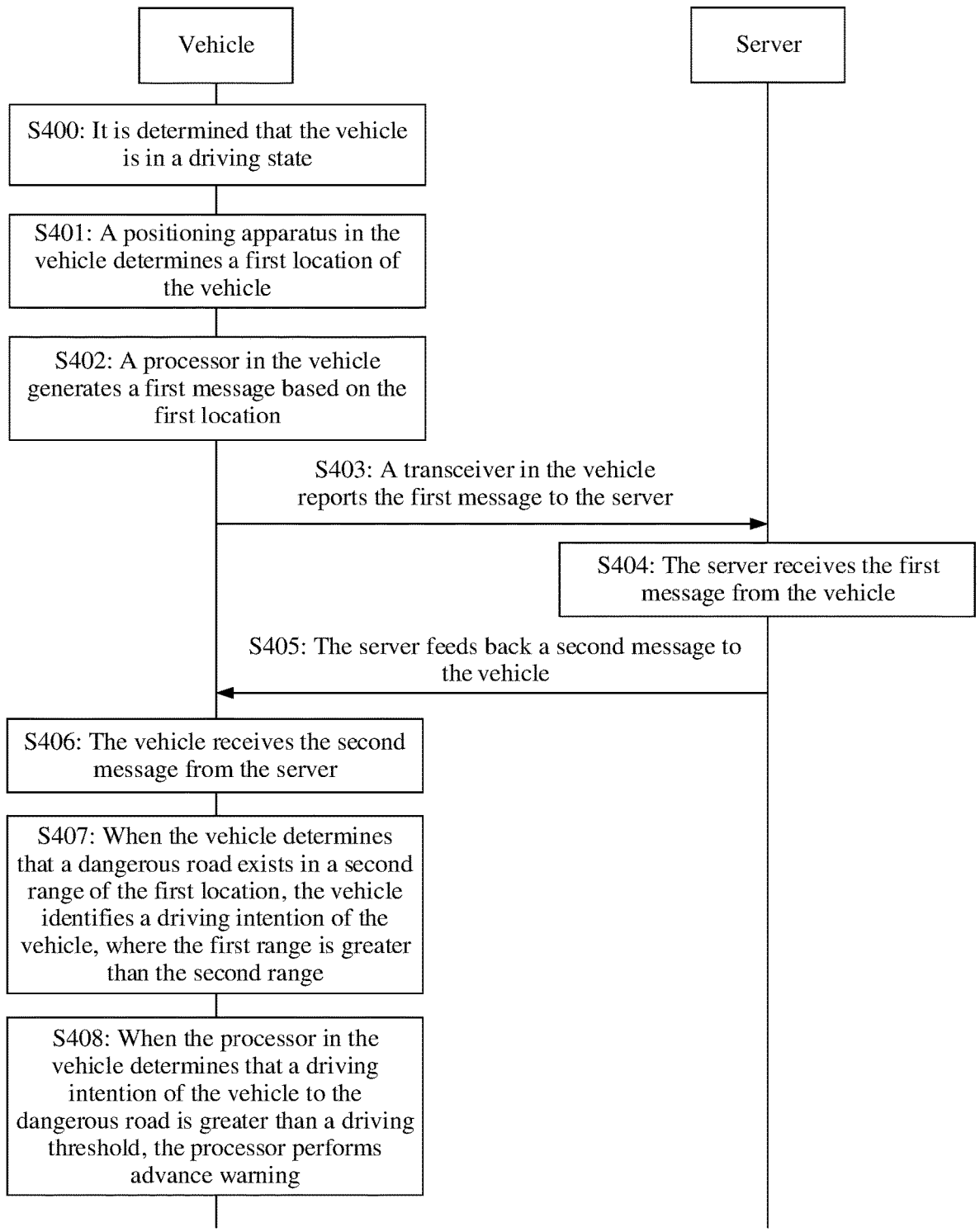
FIG. 4 is a schematic diagram of a first method for road warning according to this application.

As shown in FIG. 4, a first method for road warning provided in an embodiment of this application includes the following steps.

S400: It is determined that the vehicle is in a driving state.

In this embodiment of this application, whether the vehicle is in the driving state may be determined by using one or more of the following conditions:

Condition 1: Whether a vehicle engine is running.

Condition 2: Whether a moving distance of the vehicle within a specific time period is greater than a first preset threshold.

Condition 3: Whether the vehicle is in the P (Park) or D (Drive) gear.

S401: A GPS positioning device in the vehicle determines a first location of the vehicle.

The first location of the vehicle may be a current location of the vehicle.

S402: A processor in the vehicle generates a first message based on the first location.

In an optional manner of this embodiment of this application, the first message may include the first location; or the first message may include a first indication used to request a dangerous road in a first range and the first location.

The first range is determined by using the first location as a center.

S403. A transceiver in the vehicle reports the first message to a server.

S404: The server receives the first message from the vehicle.

S405: The server feeds back a second message to the vehicle.

In an optional manner of this embodiment of this application, the second message may include information of a dangerous road in the first range of the first location of the vehicle, or the second message may include information of a road in the first range of the first location of the vehicle.

For example, if the first message received by the server includes the first location, the server may determine the information of a road in the first range of the first location based on the first location, and feed back the information of a road in the first range of the first location as the second message to the vehicle.

For another example, if the first message received by the server includes the first indication and the first location, the server determines the information of a dangerous road in the first range of the first location, and feeds back the information of a dangerous road in the first range of the first location as the second message to the vehicle.

S406: The vehicle receives the second message from the server.

S407: When the vehicle determines, based on the second message, that a dangerous road exists in a second range of the first location, the vehicle identifies a driving intention of the vehicle, where the first range is larger than the second range.

It should be noted that, in this embodiment of this application, the vehicle may alternatively identify a driving intention of the vehicle when the vehicle determines that a dangerous road exists in the first range of the first location.

S408: When the processor in the vehicle determines that a driving intention of the vehicle to the dangerous road is greater than a driving threshold, the processor performs advance warning.

Alternatively, in an optional manner of this embodiment of this application, after determining the driving intention of the vehicle, the vehicle reports the driving intention to the server, and the server determines whether the driving intention is greater than the driving threshold, and sends an advance warning indication to the vehicle when the driving intention is greater than the driving threshold.

Figure 5:
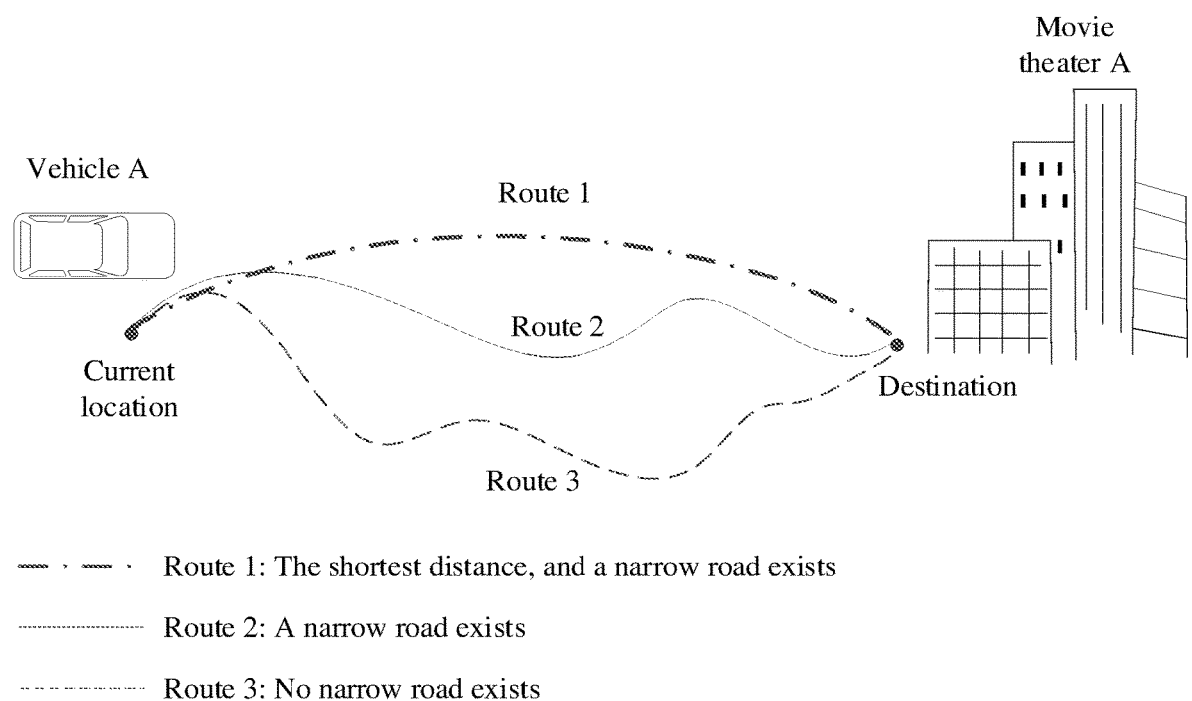
FIG. 5 is a schematic diagram of a first application scenario according to an embodiment of this application.

For example, as shown in FIG. 5, if a vehicle A is currently driving toward a movie theater A, there are three routes from the vehicle A to the movie theater A, and a shortest route from the vehicle A to the movie theater A needs to pass through a narrow road. In this case, it may be determined that a driving intention of the vehicle A to the narrow road is greater than a driving threshold. In other words, if a narrow road exists in the fastest route in the planned routes, it is determined that the driving intention of the vehicle to the narrow road is greater than the driving threshold.

For another example, it is assumed that the driving threshold is 50%. If the vehicle A is currently driving toward the movie theater A, as shown in FIG. 5, there are two routes that need to pass through a narrow road, and the routes that pass through a narrow road accounts for approximately 66% of the total three routes. It may be understood that the vehicle A has a possibility of driving to the narrow road by 66%. Therefore, the driving intention of the vehicle A to the narrow road is greater than the driving threshold.

In addition, in an optional manner of this embodiment of this application, when the dangerous road is a narrow road, in this embodiment of this application, an advance warning mechanism is triggered as follows: In addition to considering whether the driving intention of the vehicle to the narrow road is greater than the driving threshold, whether a risk index of the vehicle is greater than a risk threshold further needs to be considered.

In an optional manner of this embodiment of this application, an indicator used to perform vehicle risk index evaluation may be value of a vehicle, configuration information of the vehicle, driving years of a driver corresponding to the vehicle, a vehicle accident rate, an accident rate of the driver, acceptance of the driver on a narrow road, a driving status of the driver, a service life of the vehicle, and the like.

In an optional manner, the vehicle risk evaluation indicator is determined by using the following formula 1:

$$S=\Sigma_{i=1}^{n}(a_i*b_i) \quad \text{Formula 1}$$

S represents a vehicle risk evaluation index, n represents a quantity of selected indicators, $a_i$ is a score corresponding to the indicator, $b_i$ is a weight corresponding to the indicator, and i is a natural number not greater than n.

In an optional manner, the selected indicators used for vehicle risk evaluation are value of the vehicle, a service life of the vehicle, driving years of a driver, and an accident rate of the driver.

It is assumed that a correspondence between a score and a weight corresponding to each selected indicator is shown in the following Table 1.

| Indicator name | Indicator weight % | Scoring manner | Remarks |
|---|---|---|---|
| Vehicle value | 30 | 500,000 yuan < Vehicle value, 10 points<br>250,000 yuan < Vehicle value ≤ 500,000 yuan, 9 points<br>150,000 yuan < Vehicle value ≤ 250,000 yuan, 8 points<br>100,000 yuan < Vehicle value ≤ 150,000 yuan, 7 points<br>50,000 yuan < Vehicle value ≤ 100,000 yuan, 5 points<br>Vehicle value ≤ 50,000 yuan, 3 points | Full payment for a vehicle when the vehicle is purchased |
| Service life of a vehicle | 15 | 5 years < Vehicle value, 3 points<br>4 years < Service life ≤ 5 years, 4 points<br>3 years < Service life ≤ 4 years, 5 points<br>2 years < Service life ≤ 3 years, 6 points<br>1 year < Service life ≤ 2 years, 8 points<br>Service life ≤ 10,000, 10 points | For a service life from a time point when a vehicle is purchased to a current time point, if the time period is less than half a year, the time period is not considered as an increase of a service life; if the time period is longer than half a year, the time period is calculated as one year of service life. For example, if the time period is three years and two months, a service life is calculated as three years; and if the time period is three years and seven months, a service life is calculated as four years. |

-continued

| Indicator name | Indicator weight % | Scoring manner | Remarks |
|---|---|---|---|
| Driving years of a driver | 20 | 5 years < Driving years, 3 points<br>4 years < Driving years ≤ 5 years, 5 points<br>3 years < Driving years ≤ 4 years, 7 points<br>2 years < Driving years ≤ 3 years, 8 points<br>1 year < Driving years ≤ 2 years, 9 points<br>Driving years < 1 year, 10 points | For an actual driving time period of a driver or a time period from a time point when the driver obtains a driving license to a current time point, if the driving time period is less than half a year, the driving period is not considered as an increase of driving years; or if the driving time period is longer than half a year, the driving period is calculated as one year of driving years. |
| Accident rate of a driver | 35 | 3 times < Quantity of times, 10 points<br>3 times < Quantity of times ≤ 3, 8 points<br>1 time < Quantity of times ≤ 2, 5 points<br>Quantity of times < 1, 1 point | For an average quantity of accidents that a driver encounters every year, a quantity of accidents may be a quantity of vehicle risks. If the average quantity of accidents is less than 1, the quantity of vehicle risks is considered as 0. |

For example, the vehicle is currently driving toward the movie theater A, and the vehicle passes through a narrow road in a fastest route of driving toward the movie theater A. Although the fastest route needs to pass through the narrow road, a driving time is greatly reduced. Therefore, in this case, whether the advance warning is required may be determined based on the risk index of the vehicle.

It is assumed that the risk threshold is 5.5, and indicators used to evaluate the vehicle risk index are driving years of a driver, an accident rate of the driver, value of the vehicle, and a service life of the vehicle. When driver authorization is obtained, it is learned that the driver has driven the vehicle with driving years of five years, no accident occurs, the service life of the vehicle is three years, and a full payment the vehicle is 140,000 yuan when the vehicle is purchased.

Therefore, based on the foregoing formula 1 and the foregoing Table 1, the following may be obtained through calculation:

$$S=(7*30\%)+(6*15\%)+(5*20\%)+(1*35\%)=4.35 \quad \text{Formula 2}$$

In other words, a risk index of the vehicle is 4.35, which is less than the risk threshold 5.5. Therefore, the advance warning is not required.

On the contrary, if a vehicle risk index calculated based on the foregoing evaluation indicators is greater than or not less than the risk threshold, the advance warning needs to be performed.

In addition, in this embodiment of this application, the risk index of the vehicle/driver on the narrow road may be further updated based on a driving action of the vehicle/driver on the narrow road, to determine a reminder of a narrow road in the vehicle/driver driving next time.

For example, a driver is used as an example. If the driver deliberately bypasses a narrow road after being reminded, 1 may be recorded in a flag bit. When the driver (not necessarily driving the vehicle) is in a next vehicle driving process, if a narrow road exists ahead, advance warning is performed. If the driver continues to move forward after being reminded of the narrow road, 0 may be recorded in the flag bit. When the driver (not necessarily driving the vehicle) is in a next vehicle driving process, when a narrow road of the foregoing narrow road type exists ahead, advance warning may not be performed.

Further, in an optional manner of this embodiment of this application, after driving into the narrow road, the vehicle may collect feature information of the current narrow road by using the collection apparatus in the vehicle. For example, the following are collected: time, a width, a location, and a length of a narrow road, a probability that a non-motor vehicle appears, and a passable width (which may be understood as a width enabling a vehicle to actually pass through the narrow road existing when vehicles are parked on two sides of the narrow road).

Then, the vehicle sends the collected feature information of the narrow road to the server by using a communication system of the vehicle. In this way, after receiving the feature information of the narrow road, the server updates and improves a map region corresponding to the narrow road.

Further, when the vehicle does not drive on the narrow road, this embodiment of this application may plan a new driving route for the driver.

According to the method, when using a vehicle to travel, a user may be indicated in advance that a narrow road exists, based on a driving intention of the vehicle and a distance from the narrow road, to effectively prevent the vehicle from driving into the narrow road, so as to ensure driving safety, convenience, and the like.

Figure 6:
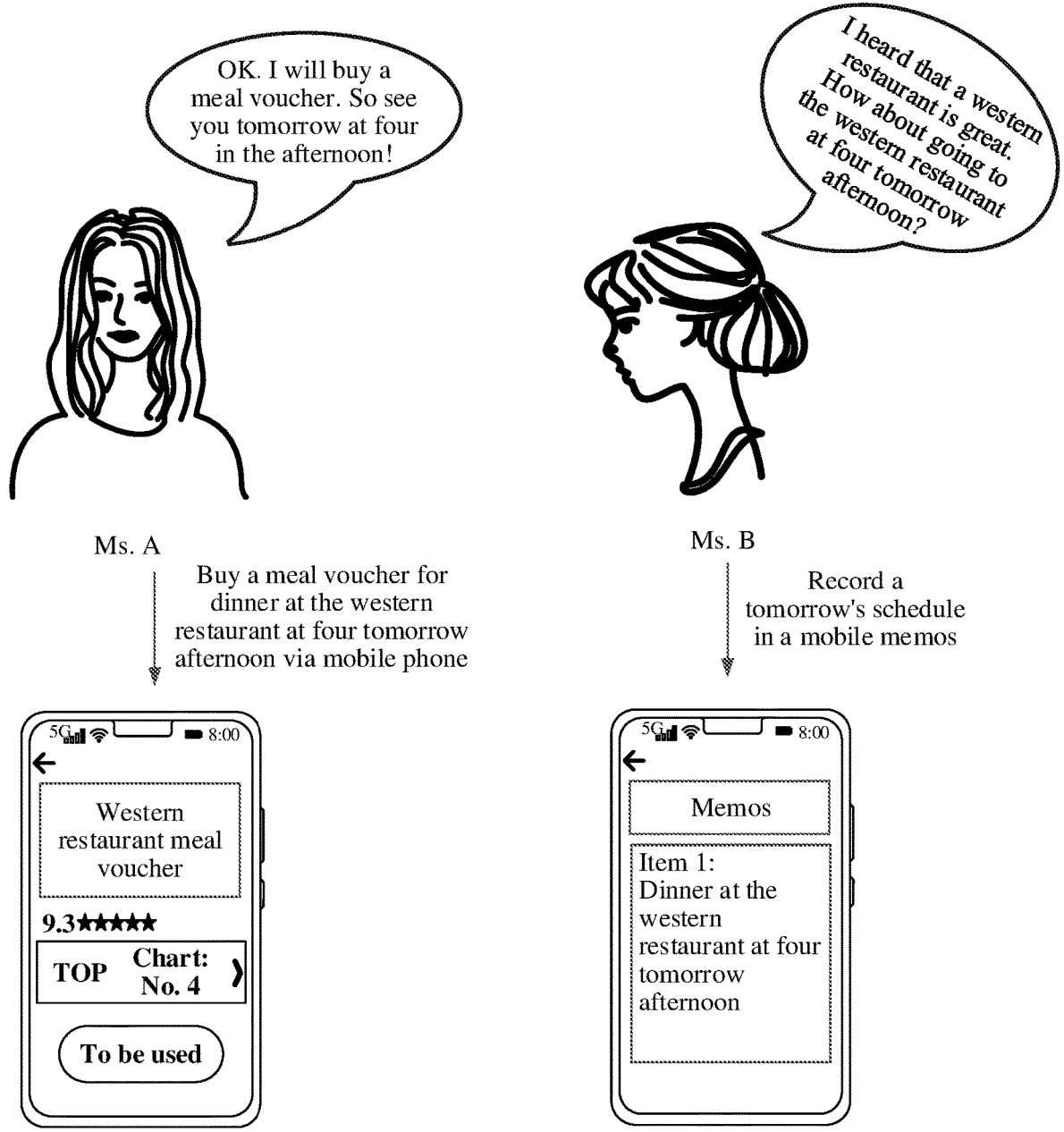
FIG. 6 is a schematic diagram of a second application scenario according to an embodiment of this application.

For example, a narrow road included in a dangerous road is used as an example. It is assumed that a scenario in which the method for road warning in FIG. 4 is applied is as follows:

As shown in FIG. 6, Ms. A and Ms. B have an appointment to go to a western restaurant at four tomorrow afternoon. Ms. A buys a meal voucher for dinner at the western restaurant at four tomorrow afternoon via mobile phone, and Ms. B writes down an item, in a mobile memo, that is, an appointment with Ms. A at the western restaurant at four tomorrow afternoon.

Figure 7:
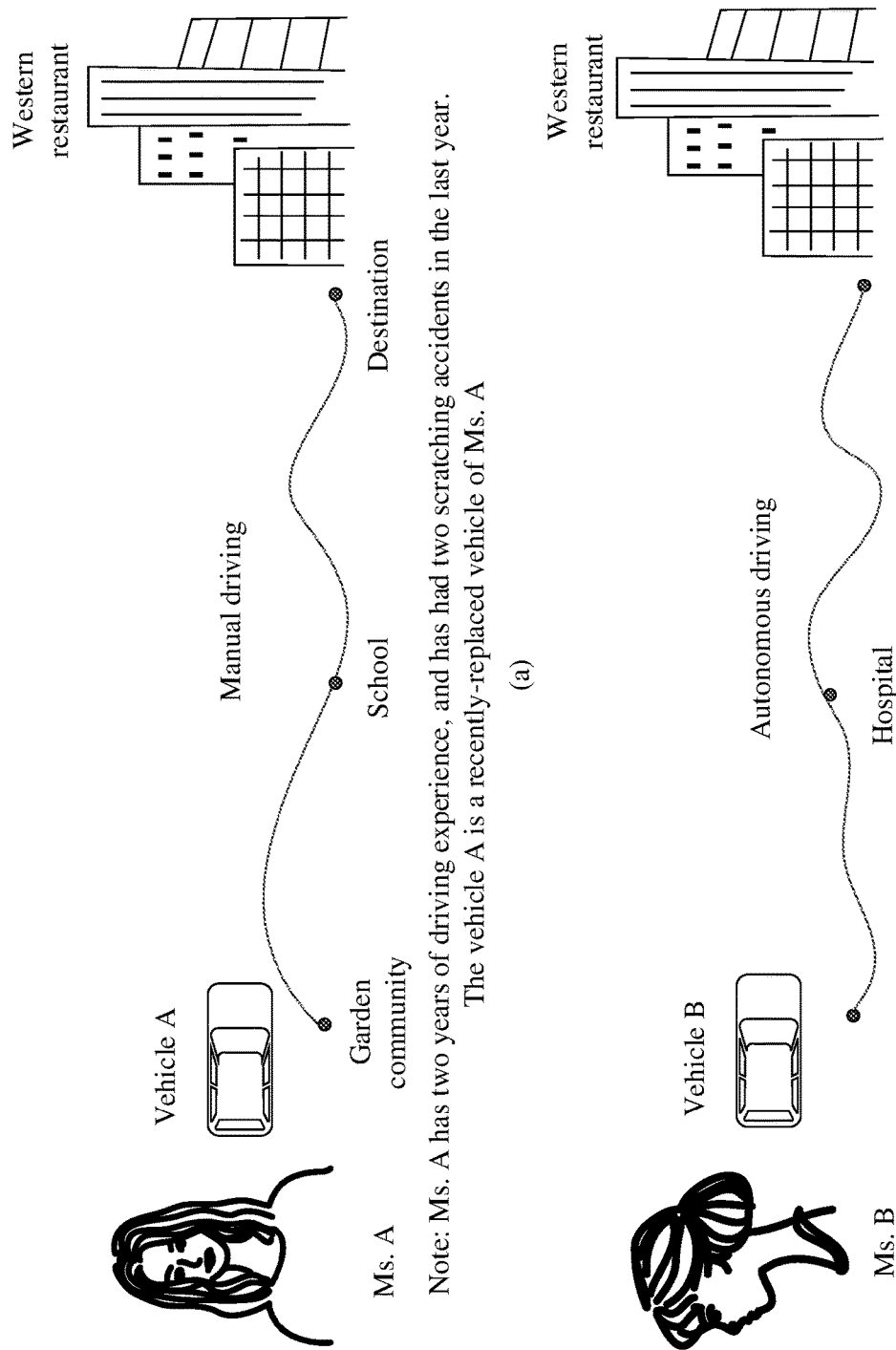
FIG. 7 is a schematic diagram of a third application scenario according to an embodiment of this application.

As shown in (a) in FIG. 7, at three afternoon on the current day, Ms. A leaves the garden community in which she lives, and drives, in a manual driving manner, a vehicle A toward the western restaurant. During the driving, Ms. A passes by a school. Ms. A has two years of driving experience, and has had two scratching accidents in the last year. The vehicle A is a recently replaced new car of Ms. A.

As shown in (b) in FIG. 7, at twenty past three afternoon on that day, Ms. B leaves the company and drives, in an autonomous driving manner, a vehicle B toward the western restaurant. During the driving, Ms. B passes by a hospital. Ms. B has three years of driving experience, and has had no driving accident in the last year. The vehicle B is equipped with advanced driver assistance system ADAS/an autonomous driving system and other functions.

In a driving process, the vehicle A and the vehicle B respectively determine, in real time by using GPS positioning devices of the vehicle A and the vehicle B, a first location of the vehicle A and a first location of the vehicle B, and separately send a first message including the first location to a server in real time, and determine, based on a second message fed back by the server for the first message, whether a narrow road exists in a preset range.

Figure 8A:
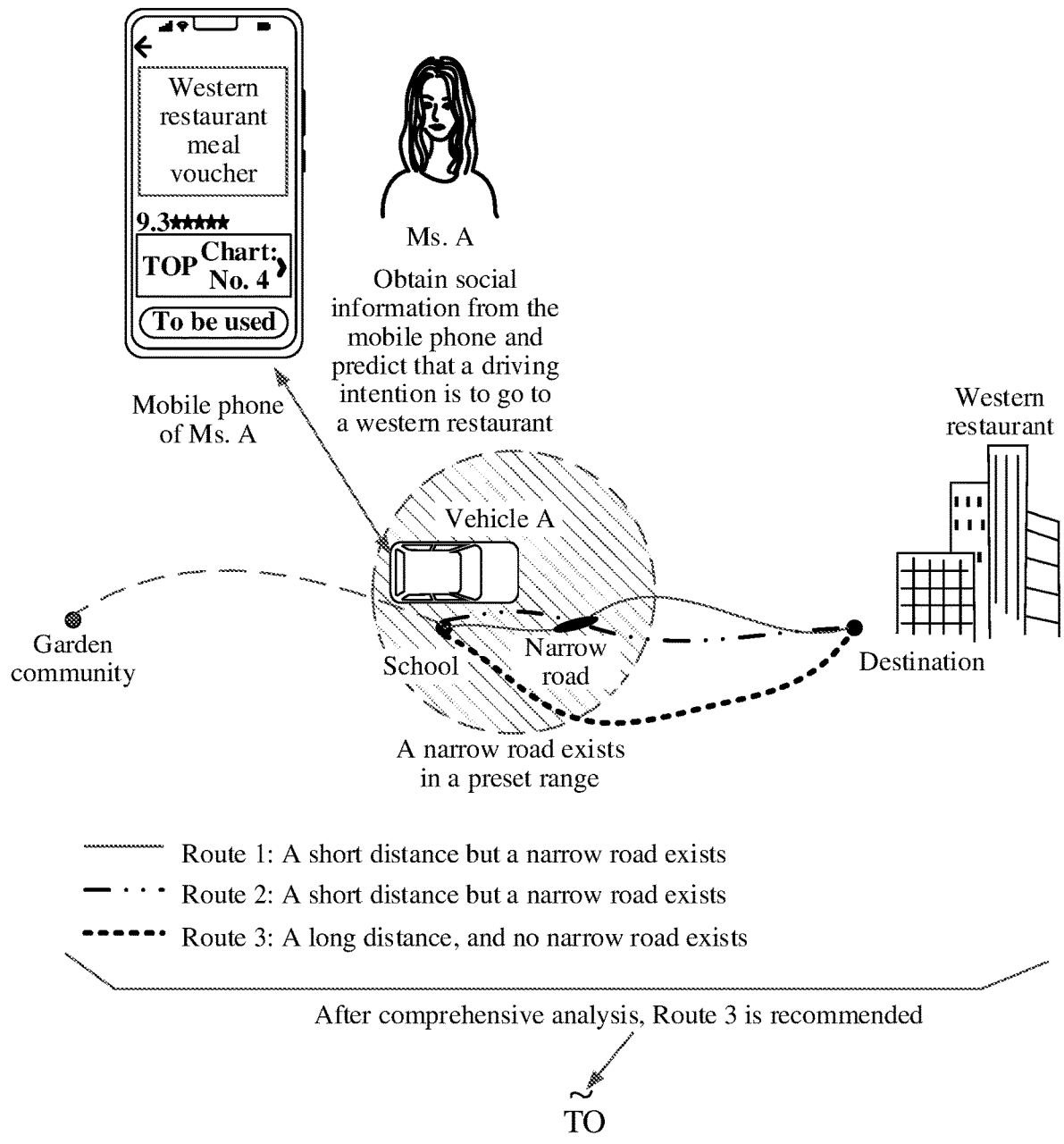

It is assumed that, as shown in FIG. 8A and FIG. 8B, when the vehicle A drives to a place near the school, the vehicle A detects that a narrow road exists in the preset range. In this case, on a premise that the vehicle A is authorized by the Ms. A, the vehicle A may predict, by obtaining social information of Ms. A, that a driving intention may be to go to the western restaurant. In an optional manner in this embodiment of this application, when the social information is stored in a portable terminal device of Ms. A, for example, a mobile phone, the vehicle may obtain, on a premise of authorization of Ms. A, the social information in the mobile phone of Ms. A connected to the vehicle through a data line; or the vehicle may obtain, on a premise of authorization of Ms. A, the social information in the mobile phone of Ms. A connected to the vehicle through Bluetooth.

After the vehicle A determines the driving intention, it is analyzed that there are three routes for the vehicle A to arrive at the western restaurant from the current location. Distances of a route 1 and a route 2 are short, but both need to pass through a narrow road. Only a route 3 does not need to pass through a narrow road, but a distance between the route 3 and the western restaurant is relatively long.

The vehicle A analyses the driving intention of the vehicle A and a vehicle risk indicator and learns that, Ms. A has short driving years and a relatively high accident rate, a vehicle value is relatively high due to a short time period after the vehicle A is purchased, and it is a time period of high student mobility because the current time is around there to four in the afternoon. Therefore, for safety reasons, the vehicle A triggers an advance warning mechanism to indicate Ms. A the following content: A narrow road exists ahead. Be careful to avoid the road. It is advised to change to Route 3. For example, the vehicle A indicates, by using a display in the vehicle, Ms. A to avoid the narrow road, and recommends the route 3 to Ms. A.

Figure 9A:
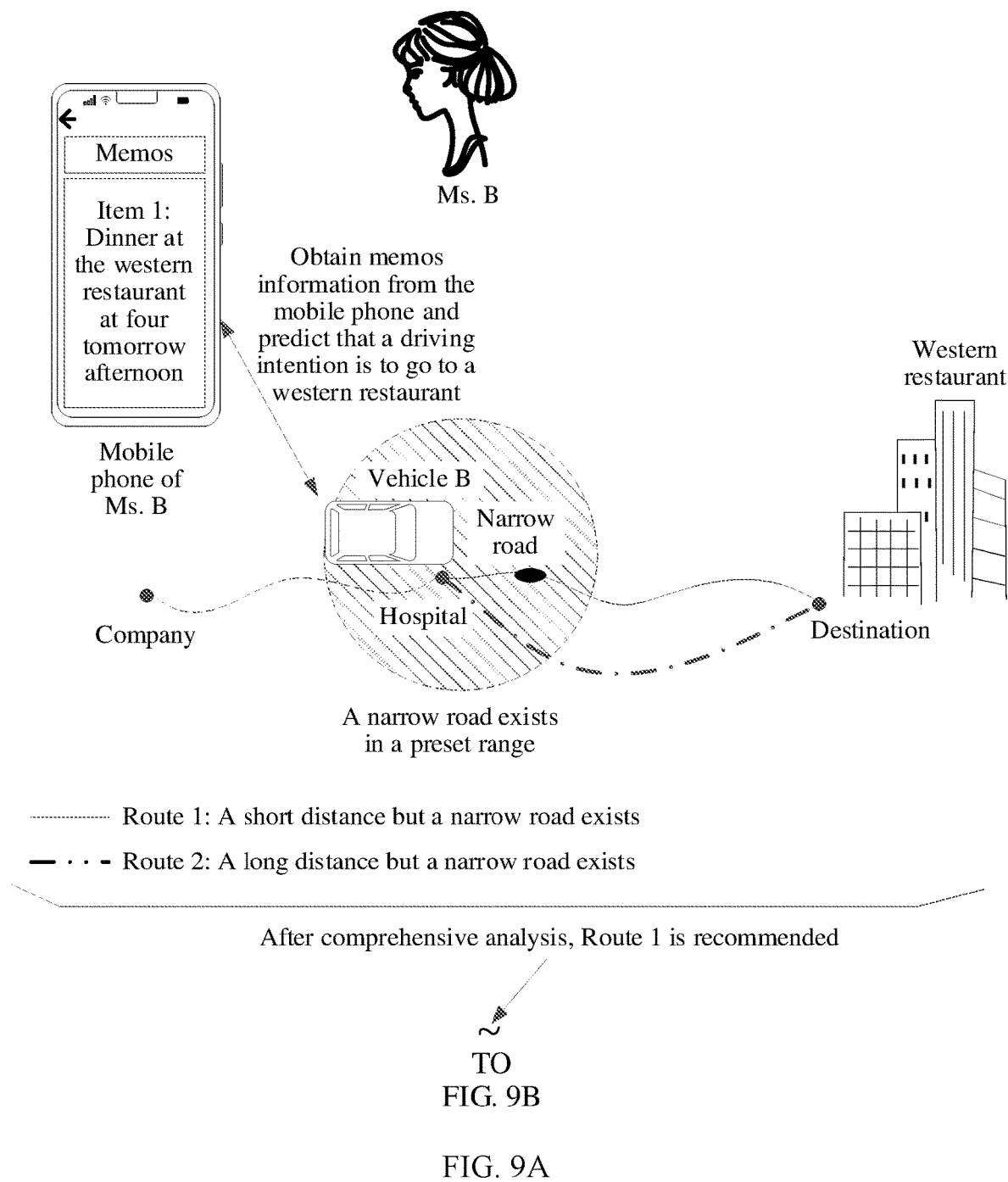

It is assumed that, as shown in FIG. 9A and FIG. 9B, when the vehicle B drives to the hospital, the vehicle B detects that a narrow road exists in a preset range. In this case, the vehicle B may predict, by obtaining memo information in a mobile phone of Ms. B that is connected to the vehicle B through Bluetooth, that a driving intention may be to go to the western restaurant. After the vehicle B determines the driving intention, it is analyzed that there are two routes for the vehicle B to arrive at the western restaurant from the current location. A route 1 is relatively short and needs to pass through a narrow road, and a route 2 is relatively long and does not need to pass through a narrow road.

The vehicle B analyses the driving intention of the vehicle B and a vehicle risk indicator and learns that, Ms. B has long driving years and a relatively low accident rate, and the vehicle B currently drives by using functions such as the advanced driver assistance system ADAS/the autonomous driving system. In addition, because Ms. B leaves late, if she chooses the long-distance route 2 that does not need to pass through a narrow road, she may not be able to arrive at the western restaurant before the agreed time point four. Therefore, in comprehensive consideration, the vehicle B is fully capable of handling a narrow road, and an advance warning mechanism does not need to be triggered. For example, the vehicle B indicates Ms. B, by using a display in the vehicle, the following content: There will be a narrow road ahead, pay attention to driving safety, and recommends the route 1 to Ms. B.

For example, a road without an exit included in a dangerous road is used as an example. It is assumed that a scenario in which the method for road warning in FIG. 4 is applied is as follows:

As shown in (a) in FIG. 7, Ms. A leaves the garden community in which she lives, and drives, in a manual driving manner, the vehicle A toward the western restaurant. During the driving, Ms. A passes by a school. In a driving process, the vehicle A determines, in real time by using the GPS positioning device of the vehicle A, a first location of the vehicle A, sends a first message including the first location to the server in real time, and determines, based on a second message fed back by the server for the first message, whether a road without an exit exists in a preset range.

Figure 10:
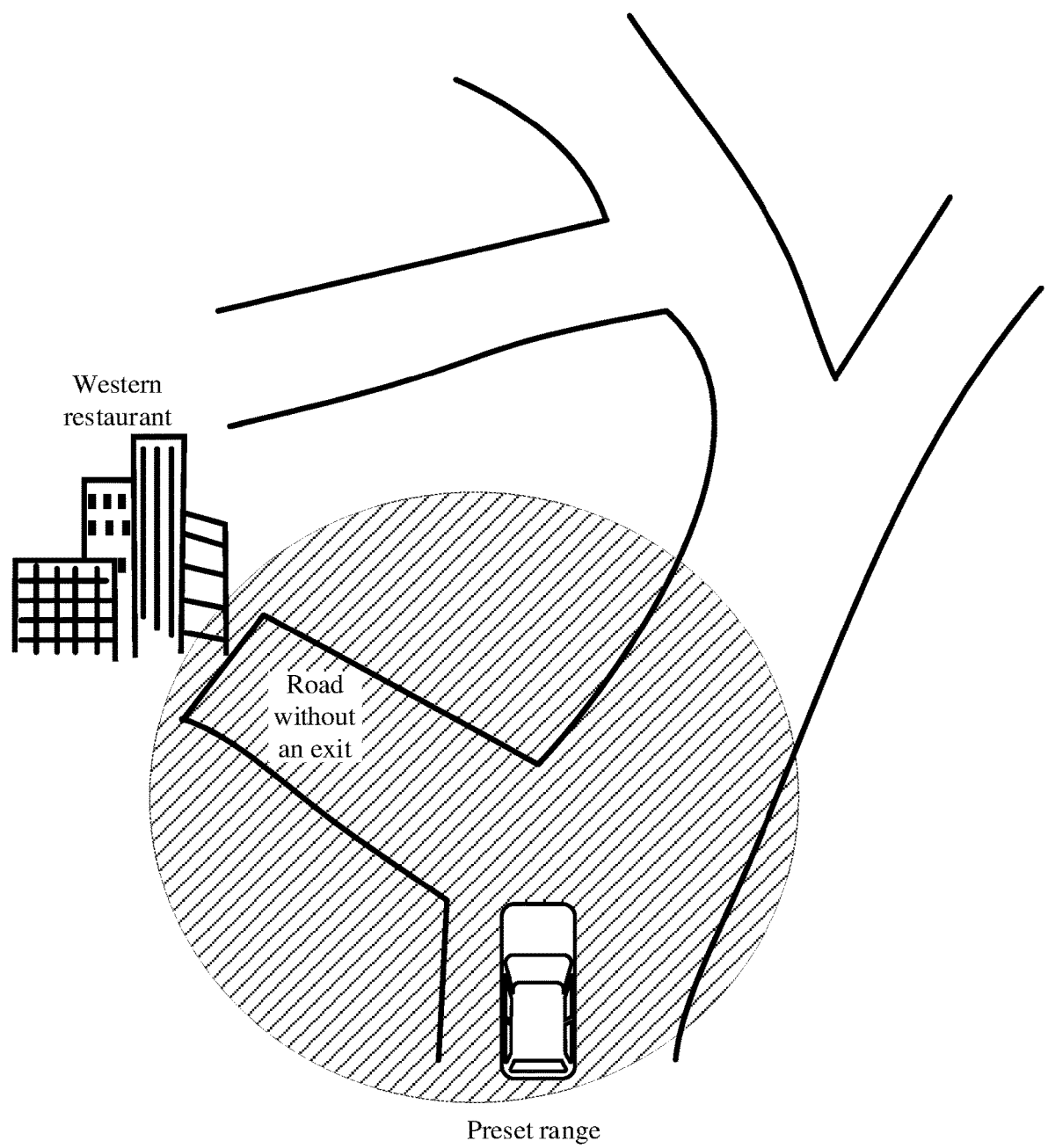
FIG. 10 is a schematic diagram of a sixth application scenario according to an embodiment of this application.

It is assumed that, as shown in FIG. 10, when the vehicle A drives to a place near the school, the vehicle A detects that a road without an exit exists in the preset range. In addition, on a premise that the vehicle A is authorized by the Ms. A, the vehicle A may predict, by obtaining social information of the Ms. A, that a driving intention may be to go to the western restaurant. If the western restaurant is in a left front direction of the vehicle A, and a road without an exit exists in a road section corresponding to the left front of the vehicle A, it may be determined that a driving intention to the road without an exit of the vehicle A is greater than a driving threshold.

Therefore, in a driving process of the vehicle A, for safety reasons, the vehicle A triggers the advance warning mechanism, to indicate Ms. A the following content: A road without an exit exists ahead. Be careful to avoid the road.

Embodiment 2: When the dangerous road is a narrow road, a narrow dangerous road existing in a planned route is marked in a navigation route, and advance warning is performed.

Figure 11:
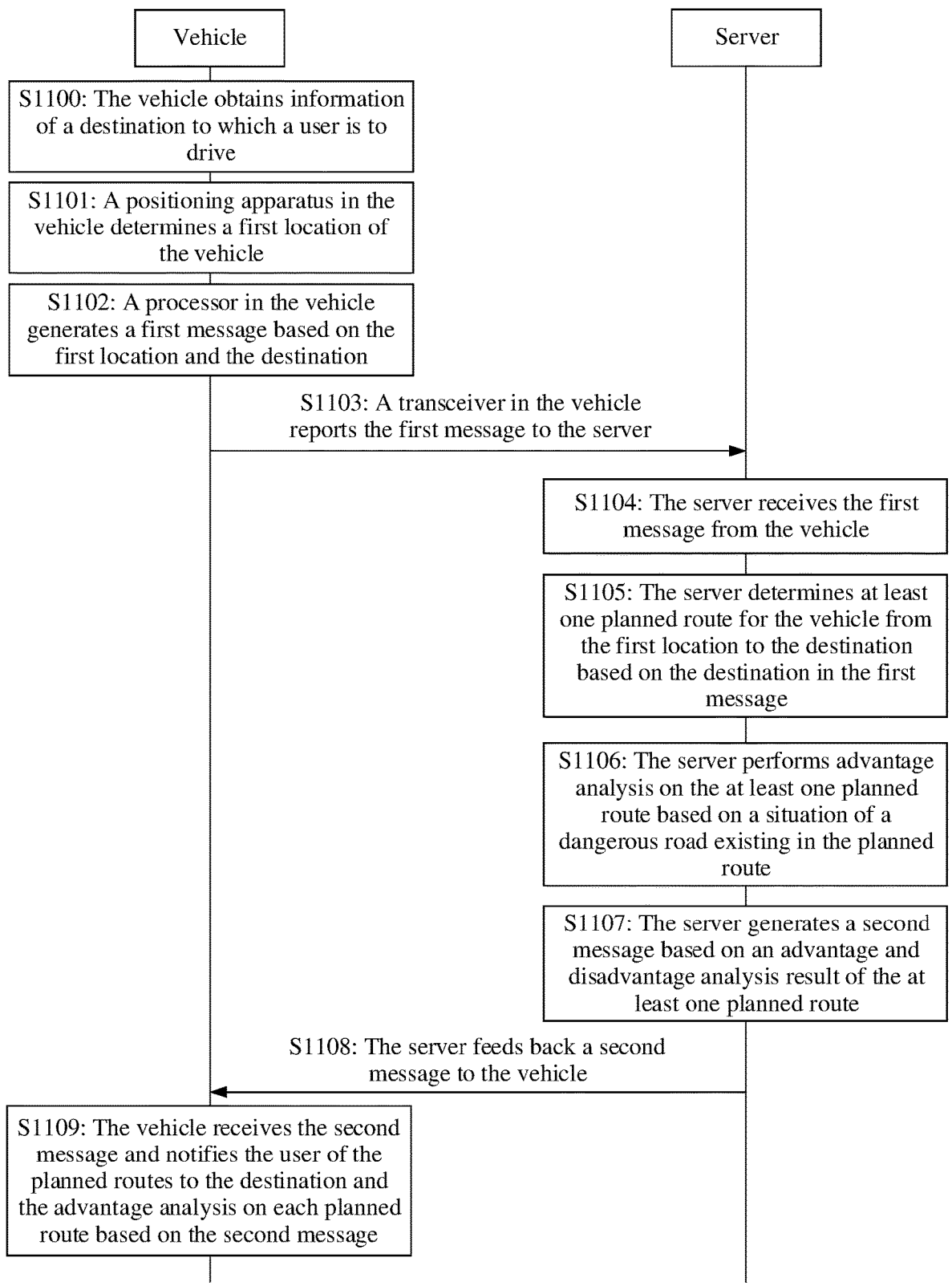
FIG. 11 is a schematic diagram of a second method for road warning according to this application.

As shown in FIG. 11, a second method for road warning provided in an embodiment of this application includes the following steps.

S1100: A vehicle obtains information of a destination to which a user is to drive.

In an optional manner of this embodiment of this application, when navigation applied for the vehicle is implemented by vehicle navigation, the vehicle may determine destination information by receiving information entered by a user in a vehicle navigation apparatus; or when navigation applied for the vehicle is implemented by mobile phone navigation, an electronic apparatus may obtain, in a manner of communicating with a mobile phone, destination information entered by the user in the mobile phone navigation.

S1101: A positioning apparatus in the vehicle determines a first location of the vehicle.

The first location of the vehicle may be a current location of the vehicle.

S1102: A processor in the vehicle generates a first message based on the first location and the destination.

S1103: A transceiver in the vehicle reports the first message to a server.

S1104: The server receives the first message from the vehicle.

S1105: The server determines, based on the destination in the first message, at least one planned route for the vehicle from the first location to the destination.

S1106: The server performs advantage analysis on the at least one planned route based on a situation of a narrow road existing in the planned route.

For example, a larger quantity of narrow roads existing in the planned route or a longer distance of the narrow road existing in the planned route indicates a lower advantage of the planned route.

In an optional manner of this embodiment of this application, when performing advantage and disadvantage analysis on the at least one planned route, the server may further perform analysis based on a distance length, a congestion situation, whether an intersection toll is charged, whether a traffic accident occurs, and another aspect of the route.

Further, according to an optional method in this embodiment of this application, the server may mark a narrow road region existing in the planned route, to indicate a location of the narrow road, so as to provide a prompt.

S1107: The server generates a second message based on an advantage and disadvantage analysis result of the at least one planned route.

S1108: The server feeds back the second message to the vehicle.

S1109: The vehicle receives the second message and notifies the user of the planned routes to the destination and the advantage analysis on each planned route based on the second message.

Based on the foregoing method, when using a navigation apparatus to perform navigation, the user may directly learn a narrow road situation in a plurality of planned routes to the destination and comprehensive advantages of the routes, to select a most suitable route for driving based on an actual requirement. This helps perform narrow road warning to the user in a timely and effective manner, and improves flexibility, practicability, and the like of route planning.

For example, it is assumed that a scenario in which the method for road warning in FIG. 11 is applied is as follows:

Ms. A buys a ticket for a movie with a showtime seven afternoon, and drives her vehicle to a movie theater at six afternoon. After starting the vehicle A, Ms. A enters a destination movie theater in a navigation apparatus in a display panel of the vehicle.

After obtaining the information of the destination (the movie theater) entered by Ms. A, the vehicle A obtains a first location in which the vehicle is currently located by using a GPS positioning apparatus in the vehicle, and sends the first location and the destination information as a first message to a corresponding server by using a communication system in the vehicle.

After receiving the first message of the vehicle A, the server corresponding to the vehicle A invokes a map database of the server to determine a planned route from the first location to the destination for the vehicle A.

Figure 12A:
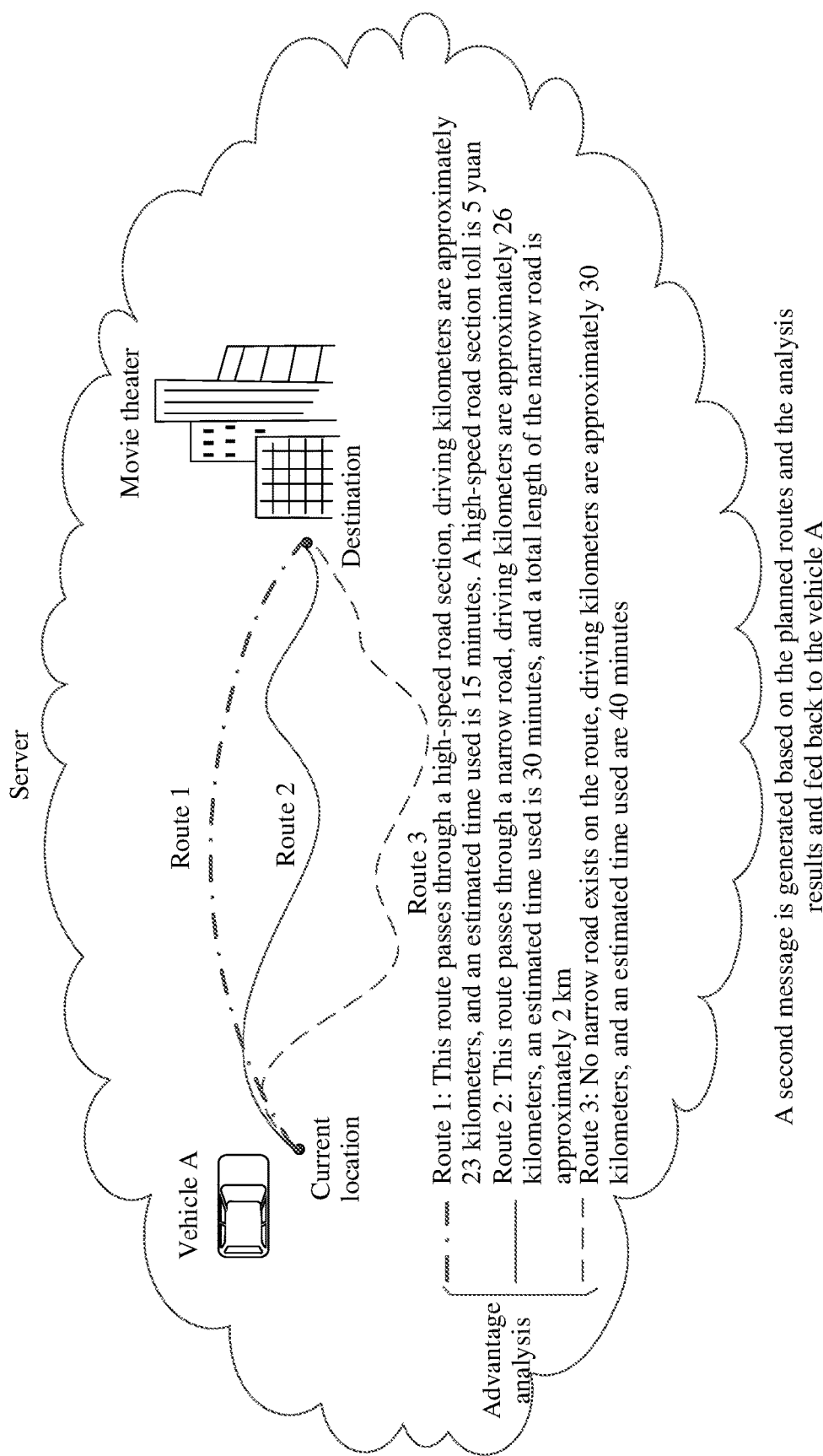
FIG. 12A to FIG. 12C are a schematic diagram of the sixth application scenario according to an embodiment of this application.
Figure 12B:
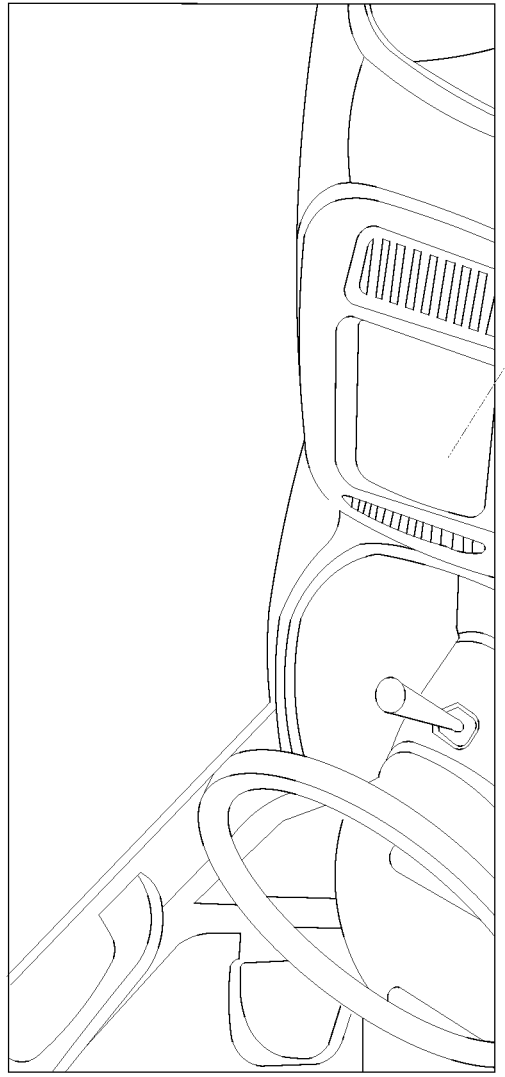
Figure 12C:
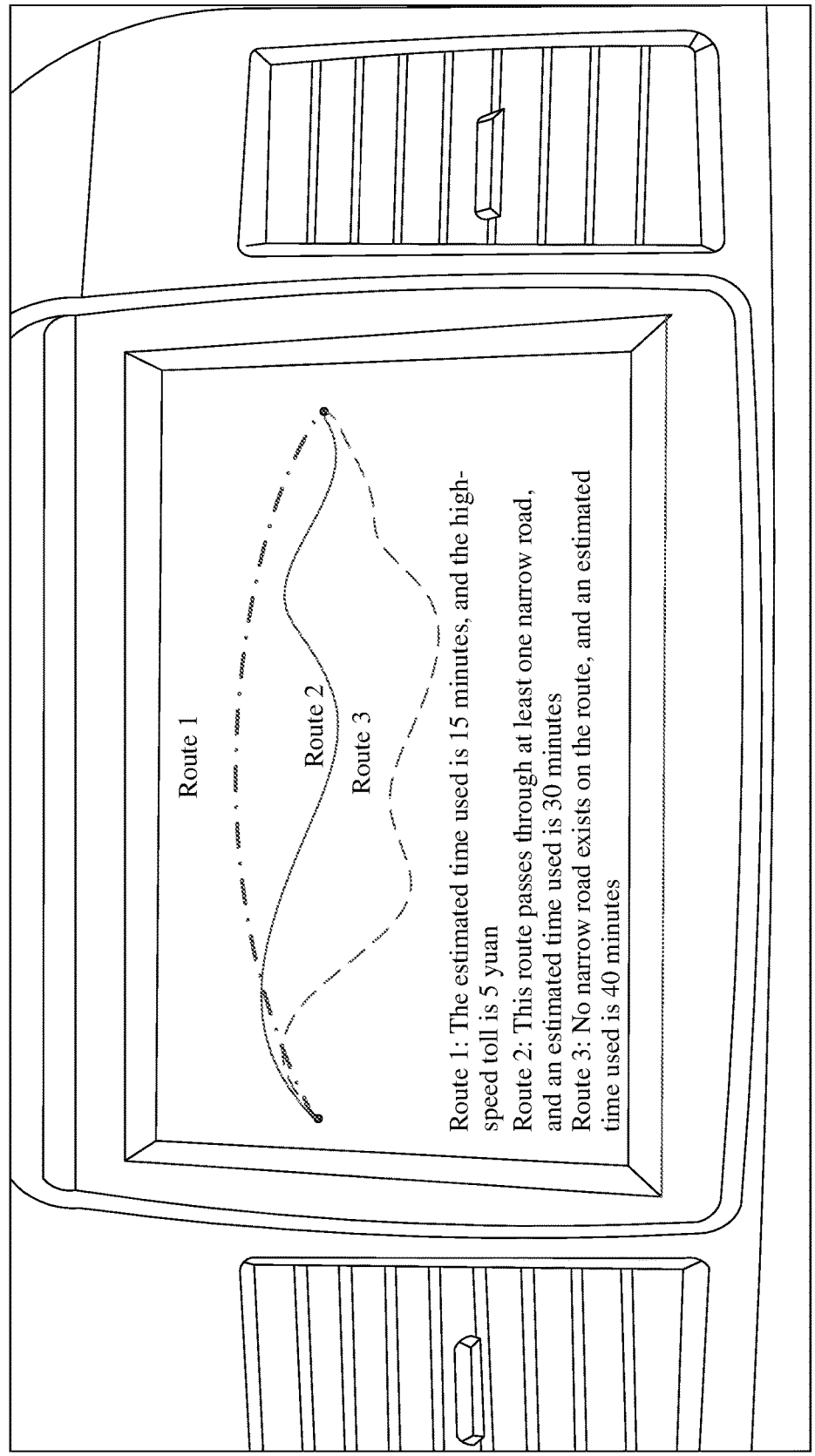

For example, as shown in FIG. 12A to FIG. 12C, there are three planned routes from the first location to the destination for the vehicle A:

Route 1: This route passes through a high-speed road section, driving kilometers are approximately 23 kilometers, and an estimated time used is 15 minutes. A high-speed road section toll that is charged is 5 yuan.

Route 2: This route passes through at least one narrow road, driving kilometers are approximately 26 kilometers, an estimated time used is 30 minutes, and a total length of the narrow road is approximately 2 km.

Route 3: No narrow road exists on the route, driving kilometers are approximately 30 kilometers, and an estimated time used is 40 minutes.

Further, the server further performs advantage analysis on the three obtained planned routes based on a preset advantage analysis indicator, and feeds back the planned routes and an analysis result as a second message to the vehicle A. After receiving the second message from the server, the vehicle A displays the three routes and advantage analysis information of the three routes on a display of the vehicle.

The user may select one of the three routes for driving of the vehicle based on an actual situation.

Embodiment 3: After determining that a vehicle moves into a monitoring range, a server in a dangerous road sends a warning indication to the vehicle.

Figure 13:
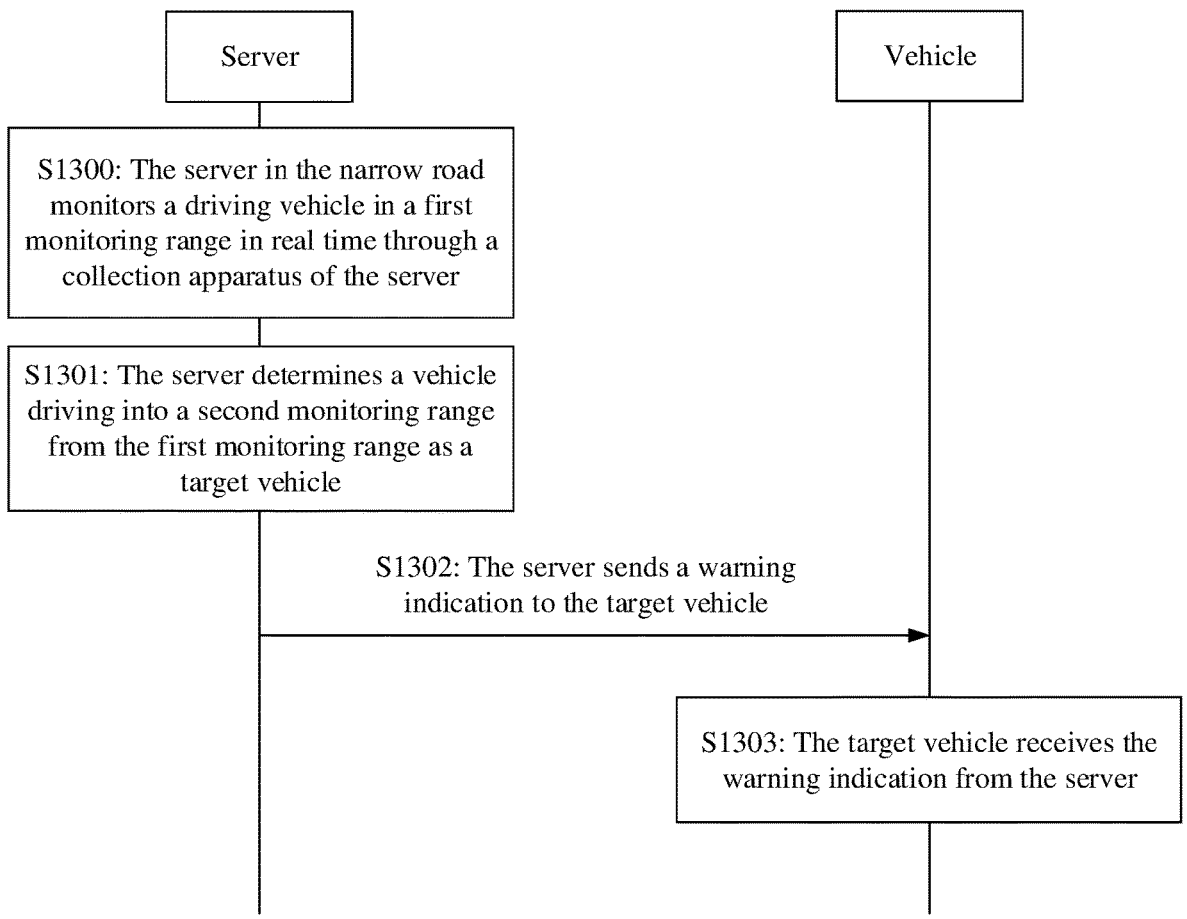
FIG. 13 is a schematic diagram of a third method for road warning according to this application.

As shown in FIG. 13, a third method for road warning provided in an embodiment of this application includes the following steps.

S1300: The server in the dangerous road monitors a driving vehicle in a first monitoring range in real time by using a sensing apparatus and/or a shooting apparatus of the server.

The dangerous road described in this embodiment of this application includes a narrow road and/or a road without an exit.

In an optional manner of this embodiment of this application, the server in the dangerous road may be one or more of a vehicle parked on the dangerous road, a road side apparatus RSU in the dangerous road, a cloud server corresponding to the dangerous road, and the like.

For a manner of determining the driving vehicle in S1300 in this embodiment of this application, refer to the content of S400. For brevity, details are not described herein again.

S1301: The server determines a vehicle driving into a second monitoring range from the first monitoring range as a target vehicle.

Alternatively, S1301 may alternatively be as follows:

The server determines a vehicle in the first monitoring range that has an invention of driving to the second monitoring range as a target vehicle. In this way, the target vehicle can be reminded in a more timely and effective manner.

S1302: The server sends a warning indication to the target vehicle.

In an optional manner of this embodiment of this application, the warning indication further includes location information of a dangerous road, and the like, so that the target vehicle can learn a location of the dangerous road, and perform avoidance and route re-planning in a timely manner.

S1303: The target vehicle receives a warning indication from the server.

Based on the foregoing method, after it is determined that the vehicle drives into the first monitoring range, the server in the dangerous road may determine, based on the driving intention of the vehicle, whether the vehicle has the driving intention to drive into the second monitoring range. After the vehicle has the driving intention to drive into the second monitoring range, the server sends the warning indication to the vehicle, so that the vehicle can learn a situation of the dangerous road in a timely manner, to effectively avoid a safety hazard caused by the vehicle driveling into a narrow road and avoid a difficulty in reversing the vehicle after the vehicle drives into a road without an exit, so as to ensure driving safety, convenience, and the like.

Figure 14:
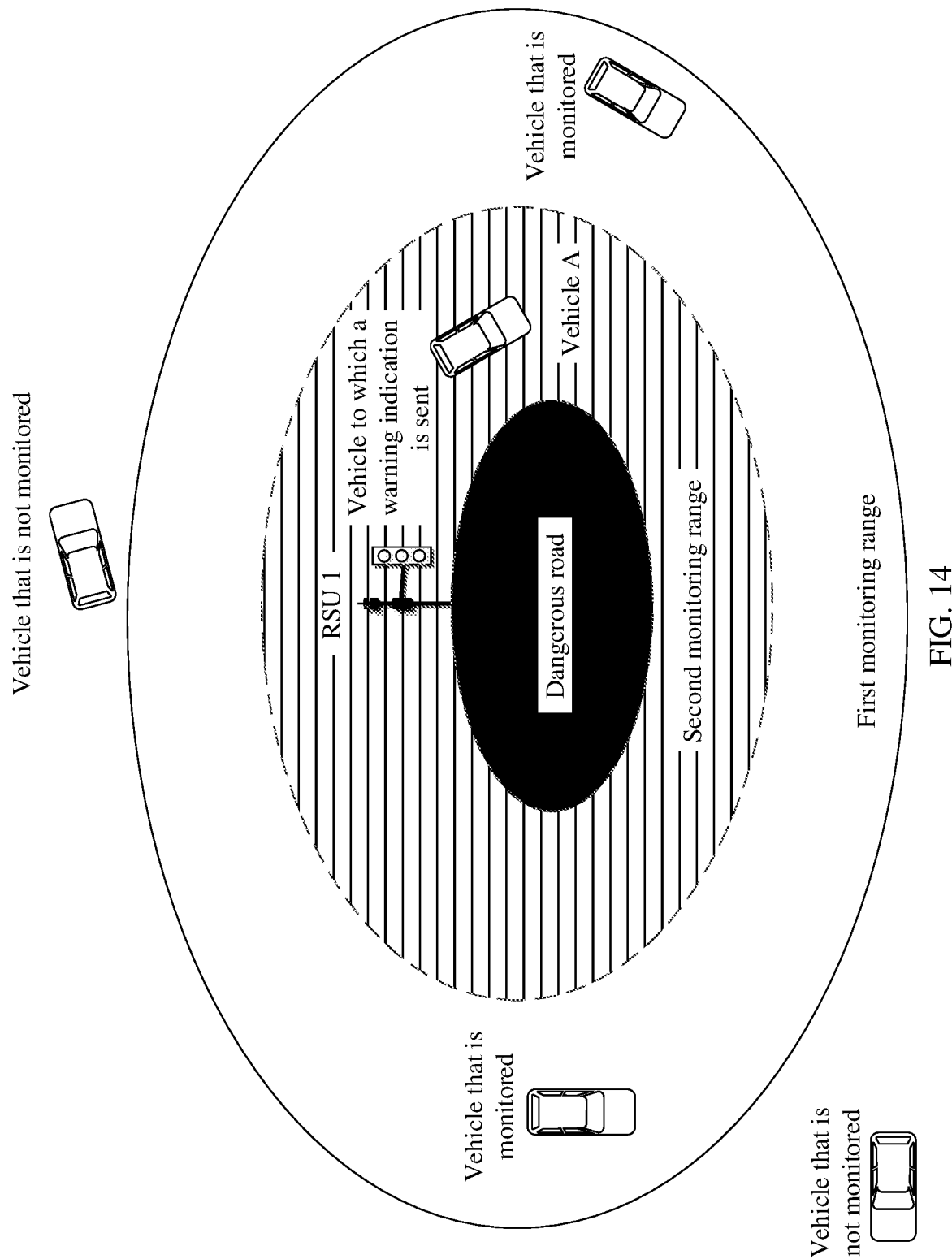
FIG. 14 is a schematic diagram of a seventh application scenario according to an embodiment of this application.

For example, it is assumed that a scenario in which the method for road warning in FIG. 13 is applied is as follows:

As shown in FIG. 14, it is assumed that a dangerous road exists in a current road section region. An RSU 1 that can be used to indicate a vehicle to perform advance warning exists on the dangerous road, a first monitoring range corresponding to the RSU 1 is a region 1, and a corresponding second monitoring range is a region 2.

After the vehicle A drives into the first monitoring range, the RSU 1 monitors a driving track of the vehicle. If the RSU 1 determines that the vehicle A drives into the second monitoring range from the first monitoring range, the RSU 1 generates a warning indication. It is assumed that the warning indication generated by the RSU 1 includes an indication of "A dangerous road exists ahead. Be careful to avoid the road" and location information of the dangerous road.

The RSU 1 sends the warning indication to the vehicle A. After receiving the warning indication, the vehicle A may notify, by using a voice broadcast apparatus in the vehicle, the user that "There is a dangerous road ahead. Be careful to avoid the road".

Figure 15:
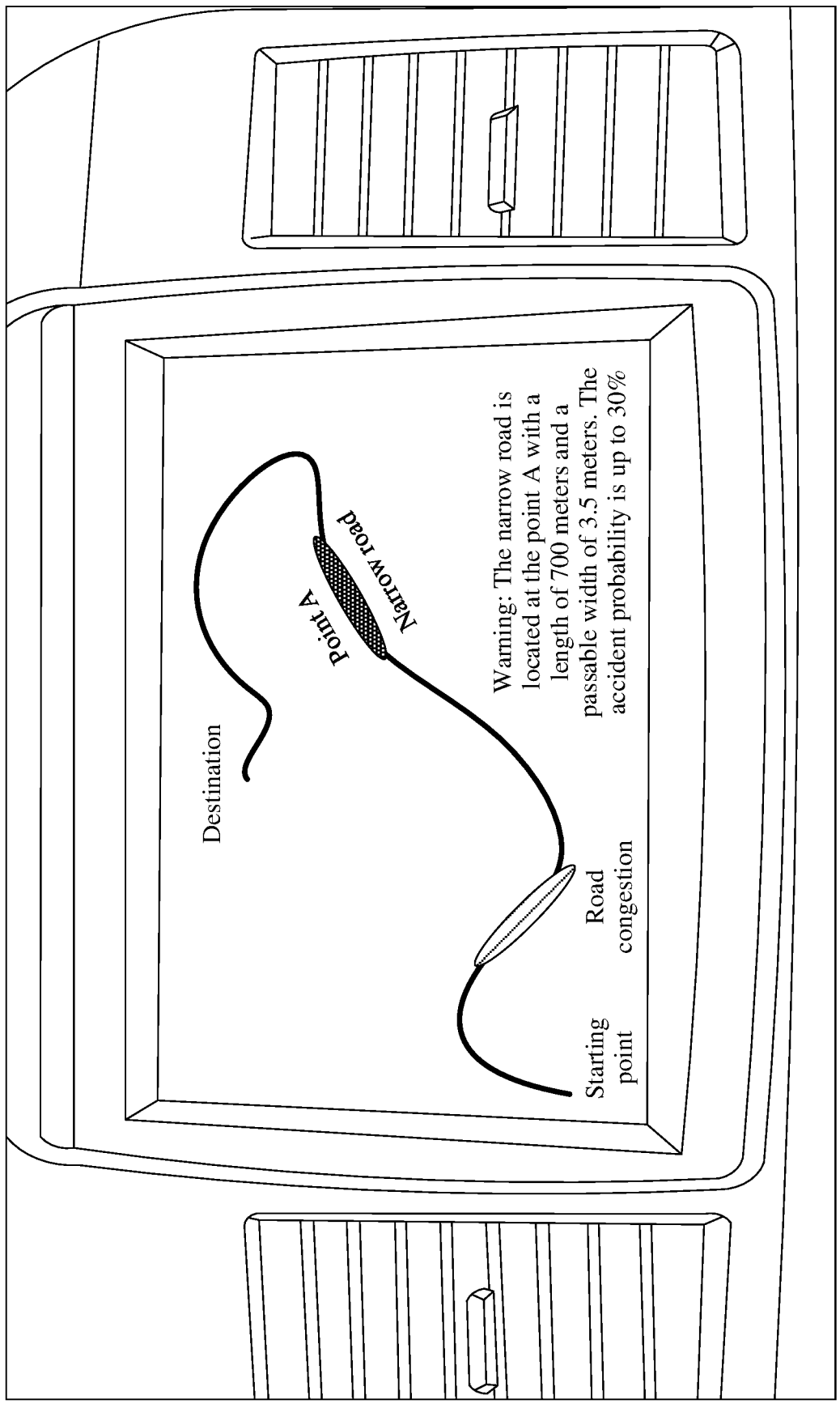
FIG. 15 is a schematic diagram of an eighth application scenario according to an embodiment of this application.

In addition, as shown in FIG. 15, the vehicle A may further display information of the dangerous road on a map by using a display apparatus in the vehicle, for example, including the following: the dangerous road is a narrow road or a road without an exit, the location information of the dangerous road, length information of the dangerous road, road width information of the dangerous road, and an accident occurrence rate of the dangerous road.

Further, in an optional manner of this embodiment of this application, in this embodiment of this application, if the vehicle A performs advance warning or receives a warning indication, the vehicle A may send a warning indication and/or information of a narrow road to another vehicle in a threshold range in which the vehicle A is located.

For example, the vehicle A may send a warning indication and/or information of a narrow road to another vehicle within 100 meters behind the vehicle.

In another optional manner of this embodiment of this application, in this embodiment of this application, if the vehicle A performs advance warning or receives a warning indication, the vehicle A may send a warning indication and/or information of a narrow road to another vehicle in a same driving direction as the vehicle A.

In this application, steps of the method for road warnings provided in Embodiment 1, Embodiment 2, and Embodiment 3 may be adaptively adjusted based on an actual situation.

In addition, in this embodiment of this application, at least two of Embodiment 1 to Embodiment 3 may be adaptively combined based on an actual situation, to obtain a new embodiment.

For example, in this embodiment of this application, to effectively reduce system overheads generated by performing the method for road warning in an unessential situation, Embodiment 1 and Embodiment 2 may be adaptively combined.

For example, in an optional manner of this embodiment of this application, in Embodiment 4 obtained by adaptively combining Embodiment 1 and Embodiment 2, when a vehicle is in a driving process, a navigation apparatus is applied, and the navigation apparatus has a road warning function described in Embodiment 2 of this application. In other words, when a user uses the navigation apparatus, it is likely that during selecting of a driving route, the user already learns that a dangerous road exists in a selected driving route.

Therefore, when road warning is performed in Embodiment 4 obtained through the combination, if it is detected that a navigation apparatus is used by a vehicle in a driving process, the vehicle does not need to perform warning in the driving process by using the method for road warning in Embodiment 1.

If it is detected that no navigation apparatus is used by the vehicle in the driving process, the vehicle continues to perform road warning by using the method for road warning in Embodiment 1 in the driving process. In an optional manner of this embodiment of this application, if the vehicle does not enable the navigation apparatus in a driving process, the vehicle may communicate with a server to obtain information such as a high-definition map stored in the server, so that the vehicle performs the method for road warning based on the high-definition map and by using another apparatus in the vehicle.

Further, the navigation apparatus in this embodiment of this application may be vehicle navigation or mobile phone navigation. If the navigation apparatus is vehicle navigation, a processor of the vehicle may detect the navigation. If the navigation apparatus is the mobile phone navigation, an electronic apparatus may communicate with a mobile phone in a communication manner to determine whether to enable the navigation, or detect, by using a driver monitor system DMS, whether the driver enables the navigation. For example, the in-vehicle camera is used to monitor a line of sight of the driver, or an in-vehicle microphone is used to check whether a navigation voice exists in the vehicle.

In embodiments of this application, a term "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Unless otherwise stated, ordinal numbers such as "first" and "second" mentioned in embodiments of this application are used to distinguish between a plurality of objects, and are not intended to limit a sequence, a time sequence, priorities, or importance of the plurality of objects. In addition, the terms "include" and "have" in embodiments, claims, and accompanying drawings of this application are not exclusive. For example, a process, a method, a system, a product, or a device including a series of steps or modules is not limited to the listed steps or modules, and may further include steps or modules that are not listed.

From the foregoing descriptions of the solutions of this application, it may be understood that, to implement the foregoing functions, each device includes a corresponding hardware structure and/or software unit for performing each function. A person of ordinary skill in the art should easily be aware that, in combination with the examples described in embodiments disclosed in this specification, units, algorithms and steps according to the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 16:
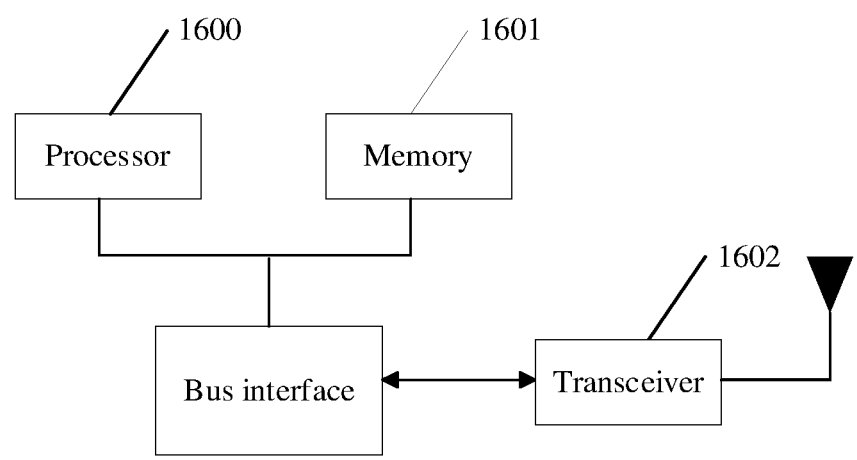
FIG. 16 is a schematic diagram of a first apparatus for road warning according to this application.

As shown in FIG. 16, an embodiment of the present invention provides an apparatus for road warning. The apparatus includes a processor 1600, a memory 1601, and a transceiver 1602.

The processor 1600 is responsible for managing a bus architecture and normal processing. The memory 1601 may store data used when the processor 1600 performs an operation. The transceiver 1602 is configured to receive and send data under control of the processor 1600, to perform data communication with the memory 1601.

A bus architecture may include any quantity of interconnected buses and bridges, in some embodiments, various circuits of one or more processors represented by the processor 1600 and memories represented by the memory 1601 are linked together. The bus architecture may further connect various other circuits such as a peripheral device, a voltage stabilizer, and a power management circuit. These are well known in the art, and therefore are not further described in this specification. The bus interface provides an interface. The processor 1600 is responsible for managing a bus architecture and normal processing. The memory 1601 may store data used when the processor 1600 performs an operation.

The processes disclosed in embodiments of the present invention may be applied to the processor 1600, or may be implemented by the processor 1600. In an implementation process, steps in a safe driving monitoring procedure may be completed by an integrated logic circuit of hardware in the processor 1600 or instructions in a form of software. The processor 1600 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in embodiments of the present invention. The general purpose processor may be a microprocessor or any conventional processor or the like. The steps of the method disclosed with reference to embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1601, and the processor 1600 reads information in the memory 1601 and completes steps of a signal processing procedure in combination with the hardware of the processor 1600.

In an optional manner of this application, if the apparatus for road warning is a server, the processor 1600 is configured to: read a program in the memory 1601 and perform the method procedure of the server in S400 to S408 shown in FIG. 4; or perform the method procedure of the server in S1100 to S1109 shown in FIG. 11; or perform the method procedure of the server in S1300 to S1303 shown in FIG. 13.

In another optional manner of this application, the apparatus for road warning is an electronic apparatus, for example, a vehicle. The processor 1600 is configured to: read a program in the memory 1601 and perform the method procedure of the vehicle in S400 to S408 shown in FIG. 4; or perform the method procedure of the vehicle in S1100 to S1109 shown in FIG. 11; or perform the method procedure of the vehicle in S1300 to S1303 shown in FIG. 13.

Figure 17:
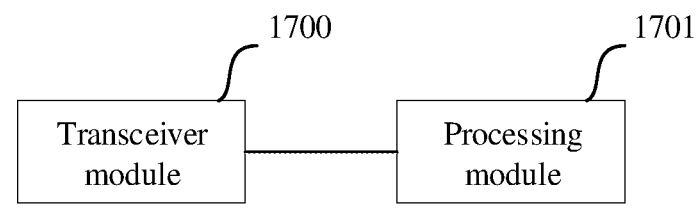
FIG. 17 is a schematic diagram of a second apparatus for road warning according to this application.

As shown in FIG. 17, the present invention provides an apparatus for road warning. The apparatus includes a transceiver module 1700 and a processing module 1701.

In an optional manner of this embodiment of this application, when the apparatus for road warning is a vehicle, the apparatus includes the transceiver module 1700 and the processing module 1701, to perform the following content:

The transceiver module 1700 is configured to: send a first message to a server, where the first message includes a current location of the vehicle; and receive a second message fed back by the server for the first message, where the second message is used to determine a location of a narrow road in a threshold range of a road section in which the vehicle is currently located, and the road section is determined by the server based on the current location of the vehicle.

The processing module 1701 is configured to: after determining, based on the second message, that a narrow road exists in a first range that includes the current location, predict a driving intention probability of the vehicle to the narrow road.

In an optional manner of this embodiment of this application, when the apparatus for road warning is a vehicle, the apparatus includes the transceiver module 1700 and the processing module 1701, to perform the following content:

The processing module 1701 is configured to determine a destination.

The transceiver module 1700 is configured to: send a first message to a server, where the first message includes a current location of the vehicle and information of the destination; and receive a second message fed back by the server for the first message, where the second message includes at least one planned route from the current location to the destination, and information of a narrow road existing in the at least one planned route.

The processing module 1701 is further configured to determine based on the second message, a situation of the narrow road existing in the at least one planned route.

In an optional manner of this embodiment of this application, when the apparatus for road warning is a vehicle, the apparatus includes a transceiver module 1700 and a processing module 1701, to perform the following content:

The transceiver module 1700 is configured to receive a warning indication from an electronic apparatus, where the warning indication is sent by the electronic apparatus to the vehicle after the electronic apparatus detects that the vehicle located in a first monitoring range has a driving intention of driving into a second monitoring range, and a narrow road exists in the second monitoring range.

The processing module 1701 is configured to determine, based on the warning indication, whether to continue to drive into the second monitoring range.

In an optional manner of this embodiment of this application, when the apparatus for road warning is a server, the apparatus includes a transceiver module 1700 and a processing module 1701, to perform the following content:

The transceiver module 1700 is configured to receive a first message from a vehicle, where the first message includes a current location of the vehicle.

The processing module 1701 is configured to determine a second message based on the first message, where the second message is used to determine a location of a narrow road in a threshold range of a road section in which the vehicle is currently located, and the road section is determined by the server based on the current location of the vehicle.

The transceiver module 1700 is further configured to feed back the second message to the vehicle, so that the vehicle determines, based on the second message, whether a narrow road exists in a first range of the current location of the vehicle.

In an optional manner of this embodiment of this application, when the apparatus for road warning is a server, the apparatus includes a transceiver module 1700 and a processing module 1701, to perform the following content:

The transceiver module 1700 is configured to: receive a first message from a vehicle, where the first message includes a current location of the vehicle and information of a destination, and the first message is sent by the vehicle after the vehicle determines the destination.

The processing module 1701 is configured to generate a second message based on the first message, where the second message includes at least one planned route from the current location to the destination, and information of a narrow road existing in the at least one planned route.

The transceiver module 1700 is further configured to feed back the second message to the vehicle.

In an optional manner of this embodiment of this application, when the apparatus for road warning is a server, the apparatus includes a transceiver module 1700 and a processing module 1701, to perform the following content:

The processing module 1701 is configured to: monitor a driving vehicle in a first monitoring range; and determine a vehicle that is in the first monitoring range and that has a driving intention to drive into a second monitoring range as a target vehicle, where the second monitoring range is smaller than the first monitoring range, and a narrow road exists in the second monitoring range.

The transceiver module 1700 is configured to send a warning indication to the target vehicle, where the warning indication is used to indicate that the target vehicle is to drive into a narrow road.

In some possible implementations, each aspect of the method for road warning provided in embodiments of the present invention may be further implemented in a form of a program product. The program product includes program code. When the program code is run on a computer device, the program code is used to enable the computer device to perform the steps in the methods for road warning based on various example implementations of the present invention described in this specification.

The program product may be any combination of one or more readable media. The readable medium may be a readable signal medium or a readable storage medium. For example, the readable storage medium may be, but is not limited to, an electrical, a magnetic, an optical, an electromagnetic, an infrared, or a semiconductor system, apparatus or device, or any combination thereof. More specific examples (a non-exhaustive list) of the readable storage medium include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any appropriate combination thereof.

A program product for road warning according to an implementation form of the present invention may employ a portable compact disc read-only memory (CD-ROM) and include program code and may run on a server device. However, the program product of the present invention is not limited thereto. In this document, the readable storage medium may be any tangible medium that includes or stores a program, and the program may be used by an apparatus or device for road warning or used in combination with the program.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of the present invention may be written in any combination of one or more program design languages. The program design languages include object-oriented program design languages such as Java and C++, and further include a conventional procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or server. When the program code is executed on the remote computing device, the remote computing device may be connected to the computing device of a user by using any type of network, including a local area network (LAN) or a wide area network (WAN), or may be connected to an external computing device.

Embodiments of this application further provide a computing device readable storage medium for the method for road warning, that is, content is not lost after a power failure. The storage medium stores a software program, including program code. When the program code is run on a computing device, when the software program is read and executed by one or more processors, any road warning solution in embodiments of this application may be implemented.

The foregoing describes this application with reference to the block diagrams and/or flowcharts of the method, the apparatus (system), and/or the computer program product in embodiments of this application. It should be understood that a block of the block diagrams and/or flowcharts and a combination of blocks in the block diagrams and/or flowcharts can be implemented by using computer program instructions. These computer program instructions may be provided to a processor of a general-purpose computer, a processor of a dedicated computer, and/or another programmable data processing apparatus to produce a machine, so that the instructions executed by the processor of the computer and/or the another programmable data processing apparatus create a method for implementing a specific function/action in the block in the flowcharts and/or block diagrams.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, to be used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

This application describes a plurality of embodiments in detail with reference to a plurality of flowcharts. However, it should be understood that the flowcharts and related descriptions of corresponding embodiments thereof are merely examples for ease of understanding, and shall not constitute any limitation on this application. Each step in each flowchart does not necessarily need to be performed. For example, some steps may be skipped. In addition, an execution sequence of each step is not fixed, and is not limited to that shown in the figure. The execution sequence of each step is determined based on a function and internal logic of the step.

A plurality of embodiments described in this application may be arbitrarily combined, or steps may intersect with each other for execution. An execution sequence of embodiments or an execution sequence of the steps of embodiments is not fixed, and is not limited to that shown in the figure. The execution sequence of embodiments and a cross execution sequence of the steps of embodiments should be determined by using functions and internal logic of embodiments and the steps.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for road warning, wherein the method comprises:
    sending, by a vehicle, a first message to a server, wherein the first message comprises a current location of the vehicle;
    receiving, by the vehicle, a second message fed back by the server in response to the first message, wherein the second message comprises a location of a dangerous road in a threshold range of a road section in which the vehicle is currently located, the dangerous road comprises at least one of a narrow road determined based on a width of the vehicle, a road without an exit, a road with a traffic accident rate greater than a first threshold probability, or a road with a congestion rate greater than a second threshold probability, and the road section is determined by the server based on the current location of the vehicle;
    in response to receiving the second message from the server, determining, by the vehicle based on the second message, that the dangerous road exists in a first range that comprises the current location;
    in response to determining that the dangerous road exists in the first range, predicting, by the vehicle, a driving intention probability of the vehicle driving into the dangerous road, wherein the threshold range comprises the first range; and
    starting, by the vehicle, advance warning when it is determined that the driving intention probability of the vehicle driving into the dangerous road is not less than a specified threshold;
    wherein when the dangerous road is the narrow road, before the vehicle starts the advance warning, the method comprises:
        determining, by the vehicle, that a risk index of the vehicle is greater than a risk threshold, wherein the risk index of the vehicle is determined by the vehicle based on at least one of value of the vehicle, configuration information of the vehicle, driving years of a driver corresponding to the vehicle, a vehicle accident rate, an accident rate of the driver, or a service life of the vehicle.

2. The method according to claim 1, wherein the dangerous road comprises at least one of the narrow road or the road without an exit.

3. The method according to claim 1, wherein determining, by the vehicle based on the second message, that the dangerous road exists in the first range that comprises the current location comprises:
    determining, by the vehicle, the location of the dangerous road in the threshold range of the road section based on information of a road in the threshold range of the road section and comprised in the second message; and
    determining, by the vehicle based on the location of the dangerous road, that the dangerous road exists in the first range that comprises the current location; or
    determining, by the vehicle based on the location of the dangerous road in the threshold range of the road section and comprised in the second message, that the dangerous road exists in the first range that comprises the current location.

4. The method according to claim 1, wherein before the vehicle predicts the driving intention probability of the vehicle driving into the dangerous road, the method further comprises:
    determining, by the vehicle based on the second message, that the dangerous road exists in a second range that comprises the current location, wherein the first range is larger than the second range.

5. The method according to claim 4, wherein the driving intention probability is determined by the vehicle based on at least one of driving information collected by a sensor of the vehicle, information in an associated terminal device, or navigation information.

6. The method according to claim 2, wherein when the dangerous road is the narrow road, after the vehicle determines that the driving intention probability is not less than the specified threshold and before the vehicle starts the advance warning, the method further comprises:

determining, by the vehicle, that the vehicle has previously received no less than a threshold quantity of advance warning, and that a proportion of continuing to drive into the narrow road in execution results corresponding to the previously received advance warning is less than a proportion threshold.

7. The method according to claim 2, wherein when the dangerous road is the narrow road, the method further comprises:
recording, by the vehicle, an execution result of at least one of the vehicle or a driver after receiving the advance warning, wherein the execution result comprises continuing to drive into the dangerous road or avoiding the dangerous road.

8. The method according to claim 1, wherein after the vehicle starts the advance warning, the method further comprises:
planning, by the vehicle, a new driving route based on the second message, wherein the new driving route does not pass through the dangerous road.

9. The method according to claim 1, wherein the driving intention probability of the vehicle driving into the dangerous road is predicted based on social information of a driver of the vehicle obtained from a terminal device of the driver.

10. A computer program product comprising computer-executable instructions stored on a non-transitory computer-readable storage medium that, when executed by at least one processor, cause an apparatus to perform operations comprising:
sending, by a vehicle, a first message to a server, wherein the first message comprises a current location of the vehicle;
receiving, by the vehicle, a second message fed back by the server in response to the first message, wherein the second message comprises a location of a dangerous road in a threshold range of a road section in which the vehicle is currently located, the dangerous road comprises at least one of a narrow road determined based on a width of the vehicle, a road without an exit, a road with a traffic accident rate greater than a first threshold probability, or a road with a congestion rate greater than a second threshold probability, and the road section is determined by the server based on the current location of the vehicle;
in response to receiving the second message from the server, determining, based on the second message, that the dangerous road exists in a first range that comprises the current location;
in response to determining that the dangerous road exists in the first range, predicting, by the vehicle, a driving intention probability of the vehicle driving into the dangerous road, wherein the threshold range comprises the first range; and
starting, by the vehicle, advance warning when it is determined that the driving intention probability is not less than a specified threshold;

wherein when the dangerous road is the narrow road, before the vehicle starts the advance warning, the operations comprise:
determining, by the vehicle, that a risk index of the vehicle is greater than a risk threshold, wherein the risk index of the vehicle is determined by the vehicle based on at least one of value of the vehicle, configuration information of the vehicle, driving years of a driver corresponding to the vehicle, a vehicle accident rate, an accident rate of the driver, or a service life of the vehicle.

11. The computer program product according to claim 10, wherein the dangerous road comprises at least one of the narrow road or the road without an exit.

12. The computer program product according to claim 11, wherein when the dangerous road is the narrow road, after the vehicle determines that the driving intention probability is not less than the specified threshold and before the vehicle starts the advance warning, the operations comprise:
determining, by the vehicle, that the vehicle has previously received no less than a threshold quantity of advance warning, and that a proportion of continuing to drive into the narrow road in execution results corresponding to the previously received advance warning is less than a proportion threshold.

13. The computer program product according to claim 10, wherein determining, by the vehicle based on the second message, that the dangerous road exists in the first range that comprises the current location comprises:
determining, by the vehicle, the location of the dangerous road in the threshold range of the road section based on information of a road in the threshold range of the road section and comprised in the second message; and determining, by the vehicle based on the location of the dangerous road, that the dangerous road exists in the first range that comprises the current location; or
determining, by the vehicle based on the location of the dangerous road in the threshold range of the road section and comprised in the second message, that the dangerous road exists in the first range that comprises the current location.

14. The computer program product according to claim 10, wherein before the vehicle predicts the driving intention probability of the vehicle driving into the dangerous road, the operations comprise:
determining, by the vehicle based on the second message, that the dangerous road exists in a second range that comprises the current location, wherein the first range is larger than the second range.

15. The computer program product according to claim 14, wherein the driving intention probability is determined by the vehicle based on at least one of driving information collected by a sensor of the vehicle, information in an associated terminal device, or navigation information.

* * * * *